United States Patent
Uozumi et al.

(10) Patent No.: US 9,206,265 B2
(45) Date of Patent: Dec. 8, 2015

(54) SOLID CATALYST COMPONENT FOR OLEFIN POLYMERIZATION, CATALYST FOR OLEFIN POLYMERIZATION, AND METHOD FOR PRODUCING OLEFIN POLYMER

(75) Inventors: Toshiya Uozumi, Chigasaki (JP); Shingo Yamada, Chigasaki (JP); Noriaki Nakamura, Chigasaki (JP); Koichiro Hisano, Chigasaki (JP); Motoki Hosaka, Chigasaki (JP); Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/131,052

(22) PCT Filed: Apr. 13, 2012

(86) PCT No.: PCT/JP2012/060162
§ 371 (c)(1),
(2), (4) Date: Apr. 9, 2014

(87) PCT Pub. No.: WO2013/005463
PCT Pub. Date: Jan. 10, 2013

(65) Prior Publication Data
US 2014/0221583 A1    Aug. 7, 2014

(30) Foreign Application Priority Data
Jul. 6, 2011   (JP) .................................. 2011-149888

(51) Int. Cl.
| | | |
|---|---|---|
| *B01J 31/00* | (2006.01) | |
| *B01J 37/00* | (2006.01) | |
| *C08F 4/02* | (2006.01) | |
| *C08F 2/00* | (2006.01) | |
| *C08F 4/52* | (2006.01) | |
| *C08F 110/06* | (2006.01) | |

(52) U.S. Cl.
CPC .................. *C08F 4/52* (2013.01); *C08F 110/06* (2013.01)

(58) Field of Classification Search
CPC ............. B01J 31/00; B01J 37/00; C08F 4/02; C08F 4/60
USPC ............. 502/127; 526/213, 124.2, 124.3, 142
See application file for complete search history.

(56) References Cited

U.S. PATENT DOCUMENTS

| | | |
|---|---|---|
| 6,605,562 B1 | 8/2003 | Morini et al. |
| 2003/0199388 A1* | 10/2003 | Morini et al. ................. 502/102 |
| 2003/0207754 A1 | 11/2003 | Morini et al. |
| 2003/0207755 A1 | 11/2003 | Morini et al. |
| 2014/0343237 A1 | 11/2014 | Sugano et al. |

FOREIGN PATENT DOCUMENTS

| | | |
|---|---|---|
| EP | 2 759 552 A1 | 7/2014 |
| GB | 1128090 | 9/1968 |
| JP | 56-811 | 1/1981 |
| JP | 57-63311 | 4/1982 |
| JP | 58-83006 | 5/1983 |
| JP | 58-138709 | 8/1983 |
| JP | 63-3010 | 1/1988 |
| JP | 3-706 | 1/1991 |
| JP | 3-62805 | 3/1991 |
| JP | 10-182720 | 7/1998 |
| JP | 2000-516987 | 12/2000 |
| JP | 2000-516988 | 12/2000 |
| JP | 2000-516989 | 12/2000 |
| JP | 2002-528606 | 9/2002 |
| JP | 2002-542347 | 12/2002 |
| JP | 2004-91513 | 3/2004 |
| WO | WO 00/26259 A1 | 5/2000 |

OTHER PUBLICATIONS

U.S. Appl. No. 14/344,431, filed Mar. 12, 2014, Sugano, et al.
International Search Report issued Jul. 17, 2012, in PCT/JP12/060162 filed Apr. 13, 2012.
Extended Search Report issued Dec. 19, 2014 in European Patent Application No. 12806963.0.
U.S. Appl. No. 14/240,588, filed Mar. 14, 2014, Uozumi, et al.
U.S. Appl. No. 14/130,799, filed Jan. 3, 2014, Tashino, et al.
U.S. Appl. No. 14/407,184, filed Dec. 11, 2014, Hosaka, et al.
U.S. Appl. No. 14/427,143, filed Mar. 10, 2015, Hosaka, et al.
U.S. Appl. No. 14/427,169, filed Mar. 10, 2015, Hosaka, et al.
U.S. Appl. No. 14/427,204, filed Mar. 10, 2015, Hosaka, et al.

* cited by examiner

*Primary Examiner* — Elizabeth Eng
(74) *Attorney, Agent, or Firm* — Oblon, McClelland, Maier & Neustadt, L.L.P.

(57) ABSTRACT

An olefin polymer that is obtained using an olefin polymerization catalyst that includes a solid catalyst component for olefin polymerization that includes titanium, magnesium, a halogen, and an ester compound (A) represented by the following formula (1): $R^1R^2C=C(COOR^3)(COOR^4)$, an organoaluminum compound, and an optional external electron donor compound, exhibits primary properties (e.g., molecular weight distribution and stereoregularity) similar to those of an olefin polymer obtained using a solid catalyst component that includes a phthalic ester as an electron donor.

18 Claims, No Drawings

SOLID CATALYST COMPONENT FOR OLEFIN POLYMERIZATION, CATALYST FOR OLEFIN POLYMERIZATION, AND METHOD FOR PRODUCING OLEFIN POLYMER

This application is a 371 of PCT/JP2012/060162, filed Apr. 13, 2012. Priority to Japanese patent application 2011-149888, filed Jul. 6, 2011, is claimed.

TECHNICAL FIELD

The invention relates to a solid catalyst component for olefin polymerization, an olefin polymerization catalyst, and a method for producing an olefin polymer that ensure that a polymer exhibiting high stereoregularity can be obtained in high yield without using a phthalic diester.

BACKGROUND ART

A solid catalyst component that includes magnesium, titanium, an electron donor compound, and a halogen as essential components has been used for polymerizing an olefin (e.g., propylene). A number of methods have been proposed that polymerize or copolymerize an olefin in the presence of an olefin polymerization catalyst that includes the solid catalyst component, an organoaluminum compound, and an organosilicon compound.

It has been known that excellent polymerization activity and stereospecificity can be obtained using an olefin polymerization catalyst that includes a solid titanium catalyst component that supports an electron donor such as a phthalic ester, an organoaluminum compound (co-catalyst), and a silicon compound that includes at least one Si—OR linkage (wherein R is a hydrocarbon group) (see JP-A-58-83006 (Patent Document 1), JP-A-56-811 (Patent Document 2), and JP-A-63-3010 (Patent Document 3), for example). It has been widely reported that it is preferable to use a phthalic ester as the electron donor. However, di-n-butyl phthalate and benzylbutyl phthalate (i.e., phthalic esters) are designated as substances of very high concern (SVHC) specified by Registration, Evaluation, and Authorization and Restriction of Chemicals (REACH). In Europe, use of di-n-butyl phthalate and benzylbutyl phthalate will be banned from Feb. 21, 2015 in principle. Therefore, a catalyst system that does not utilize such SVHC has been desired in the industry.

A solid catalyst component that utilizes diethyl phthalate has been known as a solid catalyst component that utilizes a phthalic ester that does not fall under SVHC specified by REACH (see JP-A-10-182720 (Patent Document 4) and JP-A-57-63311 (Patent Document 5)). However, along with the banning of di-n-butyl phthalate and benzylbutyl phthalate, there has been a tendency to avoid the use of phthalic esters as an electron donor for a solid catalyst component. Therefore, a solid catalyst component for olefin polymerization and a catalyst that do not utilize a phthalic ester as an electron donor have been desired.

A solid catalyst component has been known that is prepared using a fatty acid ester (e.g., malonic ester or succinic ester) or a diether (e.g., 1,2-diether, 1,3-diether, or 1,4-diether) that does not fall under SVHC as an electron donor instead of a phthalic ester.

A solid catalyst component for olefin polymerization that utilizes a malonic ester is disclosed in JP-A-2004-91513 (Patent Document 6), JP-A-2000-516987 (Patent Document 7), JP-A-2000-516989 (Patent Document 8), and JP-A-2000-516988 (Patent Document 9), for example.

Patent Document 6 discloses a solid catalyst component that utilizes a malonic diester selected from diethyl dibutylmalonate, diethyl diisopropylmalonate, diethyl diisobutylmalonate, diethyl bis(3-chloro-n-propyl)malonate, and diethyl butylbromomalonate.

Patent Document 7 discloses a solid catalyst component that utilizes a malonic diester represented by $R^1R^2C(COOR^3)(COOR^4)$ (wherein $R^1$ is a hydrogen atom, $R^2$ is a linear or branched alkyl group having 3 to 20 carbon atoms, a cycloalkyl group, or an arylalkyl group, and $R^3$ and $R^4$ are independently a linear or branched alkyl group having 4 to 20 carbon atoms, an alkylcycloalkyl group, a primary arylalkyl group, or a primary alkylaryl group).

Patent Document 8 discloses a solid catalyst component that utilizes a malonic diester represented by $R^1R^2C(COOR^3)(COOR^4)$ (wherein $R^1$ is a linear alkyl group having 1 to 20 carbon atoms, a linear alkenyl group, a cycloalkenyl group, an aryl group, an arylalkyl group, or an alkylaryl group, $R^1$ is an alkyl group having 1 to 4 carbon atoms differing from $R^2$, and $R^3$ and $R^4$ are selected from the group consisting of an alkyl group having 1 to 3 carbon atoms and a cyclopropyl group).

Patent Document 9 discloses a solid catalyst component that utilizes a malonic diester represented by $R^1R^2C(COOR^3)(COOR^4)$ (wherein $R^2$ is a linear or branched alkyl group having 5 to 20 carbon atoms, a cycloalkyl group, or an arylalkyl group having 7 to 20 carbon atoms, and $R^2$ and $R^3$ are independently an alkyl group having 1 to 3 carbon atoms or a cycloalkyl group).

JP-T-2002-542347 (Patent Document 10) discloses a solid catalyst component for olefin polymerization that includes a succinic ester represented by $(R^1OOC)CR^2R^3CR^4R^5(COOR^6)$ (wherein $R^1$ and $R^2$ are independently a linear or branched alkyl group having 1 to 20 carbon atoms, an alkenyl group, a cycloalkyl group, an aryl group, an arylalkyl group, or an alkylaryl group that optionally includes a heteroatom, $R^3$ to $R^6$ are independently a hydrogen atom, a linear or branched alkyl group having 1 to 20 carbon atoms, an alkenyl group, a cycloalkyl group, an aryl group, an arylalkyl group, or an alkylaryl group that optionally includes a heteroatom, provided that $R^3$ to $R^6$ bonded to an identical atom optionally bond to each other to form a ring, and, when $R^3$ to $R^5$ are hydrogen atoms, $R^6$ is a group selected from a primary, secondary, or tertiary alkyl group having 3 to 20 carbon atoms, a cycloalkyl group, an aryl group, an arylalkyl group, and an alkylaryl group).

A solid catalyst component for olefin polymerization that utilizes a diether is disclosed in JP-A-3-706 (Patent Document 11) and JP-A-3-62805 (Patent Document 12), for example.

Patent Document 11 discloses a solid catalyst component that utilizes a diether represented by $RO-CH^2CHR^1R^2CH_2-OR$ (wherein R, $R^1$, and $R^2$ are independently a linear or branched alkyl group having 1 to 18 carbon atoms, an alicyclic group, an aryl group, an alkylaryl group, or an arylalkyl group, provided that $R^1$ or $R^2$ may be a hydrogen atom).

Patent Document 12 discloses a solid catalyst component that utilizes a diether represented by $R^1R^2C(CH_2OR^3)(CH_2OR^4)$ (wherein $R^1$ and $R^2$ are an alkyl group having 1 to 18 carbon atoms, a cycloalkyl group, or an aryl group, and $R^3$ and $R^4$ are an alkyl group having 1 to 4 carbon atoms).

When using a catalyst system that includes a solid catalyst component that utilizes a malonic ester or a succinic ester for polymerizing propylene, the resulting polypropylene generally has insufficient stereoregularity. Therefore, it is difficult to apply such a polypropylene to injection molding or the like for which high rigidity is required, and such a polypropylene has been mainly used as a general-purpose resin for which very high mechanical strength is not required. Moreover, since hydrogen activity is relatively high, it is difficult to apply the above catalyst system to production of a resin for which a low melt flow rate is required (e.g., sheet).

When using a catalyst system that includes a solid catalyst component that utilizes a succinic ester as internal electron donor, the resulting olefin polymer has a broad molecular weight distribution, and exhibits inferior primary properties (e.g., stereoregularity) as compared with a polymer produced using a solid catalyst that utilizes a phthalic ester as an electron donor. Therefore, it is difficult to produce resins of various grades using the above catalyst system.

When using a catalyst system that includes a solid catalyst component that utilizes a diether as an internal electron donor for polymerizing propylene, the resulting polypropylene (olefin polymer) generally has insufficient stereoregularity, and has a narrow molecular weight distribution suitable for high melt flow fibers. However, when producing a sheet, a blow molding body (e.g., bottle), a film, or a high-rigidity injection molding body, it is necessary to perform multistep polymerization while changing the amount of hydrogen, or it is necessary to use a special external donor. Therefore, the polymerization process conditions become complex, and increase in cost occurs. Moreover, since hydrogen activity is very high, it is difficult to apply the above catalyst system to production of a resin for which a low melt flow rate is required. Therefore, a further improvement has been desired.

RELATED-ART DOCUMENT

Patent Document

Patent Document 1: JP-A-58-83006
Patent Document 2: JP-A-56-811
Patent Document 3: JP-A-63-3010
Patent Document 4: JP-A-10-182720 (examples)
Patent Document 5: JP-A-57-63311 (examples)
Patent Document 6: JP-A-2004-91513
Patent Document 7: JP-T-2000-516987
Patent Document 8: JP-T-2000-516989
Patent Document 9: JP-T-2000-516988
Patent Document 10: JP-T-2002-542347
Patent Document 11: JP-A-3-706
Patent Document 12: JP-A-03-62805 (examples)

SUMMARY OF THE INVENTION

Technical Problem

An object of the invention is to provide a solid catalyst component for olefin polymerization that is produced using a novel electron donor component other than a phthalic ester that is suitable for producing an olefin polymer having primary properties (e.g., molecular weight distribution and stereoregularity) similar to those of an olefin based polymer obtained using a solid catalyst component that utilizes a phthalic ester as an electron donor, as well as an olefin polymerization catalyst, and a method for polymerizing an olefin.

Solution to Problem

In view of this situation, the inventors of the invention conducted extensive studies. As a result, the inventors found that an olefin polymerization catalyst that essentially includes a solid titanium catalyst component (I) including titanium, magnesium, a halogen, and an ester compound having a specific structure, ensures high stereoregularity and high polymerization activity similar to those obtained using an olefin polymerization catalyst that utilizes a phthalic ester as an electron donor. This finding has led to the completion of the invention.

According to one aspect of the invention, a solid catalyst component for olefin polymerization includes titanium, magnesium, a halogen, and an ester compound represented by the following general formula (1),

$$R^1R^2C\!=\!C(COOR^3)(COOR^4) \qquad (1)$$

wherein $R^1$ and $R^2$ are independently an atom or a group selected from a hydrogen atom, a halogen, a linear alkyl group having 1 to 20 carbon atoms, a branched alkyl group having 3 to 20 carbon atoms, a vinyl group, a linear or branched alkenyl group having 3 to 20 carbon atoms, a linear or branched halogen-substituted alkyl group having 2 to 20 carbon atoms, a cycloalkyl group having 3 to 20 carbon atoms, a cycloalkenyl group having 3 to 20 carbon atoms, an aromatic hydrocarbon group having 6 to 20 carbon atoms, a nitrogen-containing group, an oxygen-containing group, a phosphorus-containing group, and a silicon-containing group, provided that $R^1$ and $R^2$ are either identical or different, and optionally bond to each other to form a ring, and $R^2$ has 2 or more carbon atoms when $R^1$ is a hydrogen atom or a methyl group, and $R^3$ and $R^4$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 carbon atoms, provided that $R^3$ and $R^4$ are either identical or different.

According to another aspect of the invention, an olefin polymerization catalyst includes (I) the solid catalyst component for olefin polymerization, (II) an organoaluminum compound represented by the following general formula (2), and (III) an optional external electron donor compound,

$$R^5_p AlQ_{3-p} \qquad (2)$$

wherein $R^5$ is an alkyl group having 1 to 6 carbon atoms, Q is a hydrogen atom or a halogen, and p is a real number that satisfies $0 < p \leq 3$, provided that a plurality of $R^5$ are either identical or different when a plurality of $R^5$ are present.

Advantageous Effects of the Invention

When the solid catalyst component for olefin polymerization that includes the ester compound having the above specific structure is used to polymerize an olefin, it is possible to solve the problems that occur when using a solid catalyst component that utilizes a malonic diester or a succinic diester, and ensure that an olefin polymer having stereoregularity, a molecular weight distribution, and the like similar to those of an olefin polymer obtained using a solid catalyst component that includes a phthalic ester is obtained in high yield without using a phthalic ester.

DESCRIPTION OF EMBODIMENTS

Solid Catalyst Component for Olefin Polymerization

A solid catalyst component for olefin polymerization (hereinafter may be referred to as "component (I)") according to one embodiment of the invention includes magnesium, titanium, a halogen, and the ester compound represented by the general formula (1) (electron donor compound) (hereinafter may be referred to as "ester compound (A)") as essential components.

Examples of the halogen include fluorine, chlorine, bromine, and iodine. Among these, chlorine, bromine, and iodine are preferable, and chlorine and iodine are particularly preferable.

Examples of the halogen in the general formula (1) include fluorine, chlorine, bromine, and iodine. Among these, chlorine, bromine, and iodine are preferable, and chlorine and bromine are particularly preferable. Examples of the linear alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, and the like.

Examples of the branched alkyl group having 3 to 20 carbon atoms in the general formula (1) include alkyl groups that include a secondary carbon atom or a tertiary carbon atom (e.g., isopropyl group, isobutyl group, t-butyl group, isopentyl group, and neopentyl group). Examples of the linear alkenyl group having 3 to 20 carbon atoms in the general formula (1) include an n-propenyl group, an n-butenyl group, an n-pentenyl group, an n-hexenyl group, an n-heptenyl group, an n-octenyl group, an n-nonenyl group, an n-decenyl group, and the like. Examples of the branched alkenyl group having 3 to 20 carbon atoms include alkenyl groups that include a secondary carbon atom or a tertiary carbon atom (e.g., isopropenyl group, isobutenyl group, t-butenyl group, isopentenyl group, and neopentenyl group).

Examples of the linear or branched halogen-substituted alkyl group having 2 to 20 carbon atoms include a methyl halide group, an ethyl halide group, an n-propyl halide group, an isopropyl halide group, an n-butyl halide group, an isobutyl halide group, an n-pentyl halide group, an n-hexyl halide group, an n-heptyl halide group, an n-octyl halide group, a nonyl halide group, and a decyl halide group. Examples of the halogen include fluorine, chlorine, bromine, and iodine.

Examples of the cycloalkyl group having 3 to 20 carbon atoms in the general formula (1) include a cyclopropyl group, a cyclobutyl group, a cyclopentyl group, a cyclohexyl group, a cycloheptyl group, a cyclooctyl group, a cyclononyl group, a cyclodecyl group, and the like. Examples of the cycloalkenyl group having 3 to 20 carbon atoms include a cyclopropenyl group, a cyclobutenyl group, a cyclopentenyl group, a cyclohexenyl group, a cycloheptenyl group, a cyclooctenyl group, a cyclononenyl group, a cyclodecenyl group, and the like.

Examples of the aromatic hydrocarbon group having 6 to 20 carbon atoms in the general formula (1) include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, and the like. Examples of the nitrogen-containing group in the general formula (1) include an amino group; alkylamino groups such as a methylamino group, a dimethylamino group, an ethylamino group, a diethylamino group, a propylamino group, a dipropylamino group, a butylamino group, a dibutylamino group, a pentylamino group, a dipentylamino group, a hexylamino group, a dihexylamino group, a heptylamino group, a diheptylamino group, an octylamino group, a dioctylamino group, a nonylamino group, a dinonylamino group, a decylamino group, a didecylamino group, a cyclohexylamino group, and a dicyclohexylamino group; arylamino groups or alkylarylamino groups such as a phenylamino group, a diphenylamino group, a ditolylamino group, a dinaphthylamino group, and a methylphenylamino group; polycyclic amino groups; amide groups such as an acetamide group, an N-methylacetamide group, and an N-methylbenzamide group; imino groups such as a methylimino group, an ethylimino group, a propylimino group, a butylimino group, and a phenylimino group; imide groups such as an acetoimide group and a benzimide group; a hydrazino group; a hydrazono group; a nitro group; a nitroso group; a cyano group; an isocyano group; an amidino group; a diazo group; an ammonium salt derived from an amino group; and the like.

Examples of the oxygen-containing group in the general formula (1) include an oxy group; a peroxy group; a hydroxyl group; a hydroperoxy group; alkoxy groups such as a methoxy group, an ethoxy group, a propoxy group, a butoxy group, an isopropoxy group, and an isobutoxy group; aryloxy groups such as a phenoxy group, a methylphenoxy group, a dimethylphenoxy group, and a naphthoxy group; arylalkoxy groups such as a phenylmethoxy group and a phenylethoxy group; an acetoxy group; a carbonyl group; an acetylacetonato group; an ether group; an acyl group; an oxo group; a hydroxyl group; a peroxy group; a carboxylic anhydride group; and the like.

Examples of the phosphorus-containing group in the general formula (1) include dialkyl phosphine groups such as a dimethyl phosphine group, a dibutyl phosphine group, and a dicyclohexyl phosphine group; diaryl phosphine groups such as a diphenyl phosphine group and a ditolyl phosphine group; phosphite groups (phosphide groups) such as a methyl phosphite group, an ethyl phosphite group, and a phenyl phosphite group; a phosphonic acid group; a phosphinic acid group; and the like.

Examples of the silicon-containing group in the general formula (1) include a silyl group, a siloxy group, a hydrocarbon-substituted silyl group, a hydrocarbon-substituted siloxy group, and the like. Specific examples of the silicon-containing group include hydrocarbon-substituted silyl groups such as a phenylsilyl group, a diphenylsilyl group, a trimethylsilyl group, a triethylsilyl group, a tripropylsilyl group, a tricyclohexylsilyl group, a triphenylsilyl group, a methyldiphenylsilyl group, a tritolylsilyl group, and a trinaphthylsilyl group; hydrocarbon-substituted silyl ether groups such as a trimethyl silyl ether group; silicon-substituted alkyl groups such as a trimethylsilylmethyl group; silicon-substitution aryl groups such as a trimethylsilylphenyl group; and the like.

The number of carbon atoms of $R^2$ is 2 or more when $R^1$ is a hydrogen atom or a methyl group. $R^1$ and $R^2$ in the general formula (1) optionally bond to each other to form a ring. Examples of a ring formed by $R^1$, $R^2$, and the carbon atom bonded to $R^1$ and $R^2$ include a cycloalkyl ring, a fluorenyl ring, an indenyl ring, an imidazole ring, a piperidinyl ring, and the like.

It is preferable that $R^1$ and $R^2$ in the general formula (1) be a hydrogen atom, a linear alkyl group having 1 to 6 carbon atoms, a branched alkyl group having 3 to 6 carbon atoms, a vinyl group, a linear or branched alkenyl group having 3 to 6 carbon atoms, a cycloalkyl group having 5 or 6 carbon atoms, a cycloalkenyl group having 5 or 6 carbon atoms, or an aromatic hydrocarbon group having 6 to 10 carbon atoms. It is particularly preferable that $R^1$ be a hydrogen atom or a linear alkyl group having 1 to 6 carbon atoms, and $R^2$ be a linear alkyl group having 1 to 6 carbon atoms, a branched alkyl group having 3 to 6 carbon atoms, a cycloalkyl group having 5 or 6 carbon atoms, or an aromatic hydrocarbon group having 6 to 10 carbon atoms. It is preferable that $R^3$ and $R^4$ be a linear alkyl group having 1 to 10 carbon atoms or a branched alkyl group having 3 to 8 carbon atoms. It is particularly preferable that $R^3$ and $R^4$ be a linear alkyl group having 1 to 4 carbon atoms or a branched alkyl group having 3 or 4 carbon atoms.

Examples of a preferable ester compound (A) represented by the general formula (1) include dimethyl propylidenemalonate, diethyl propylidenemalonate, di-n-propyl propylidenemalonate, diisobutyl propylidenemalonate, and di-n-butyl propylidenemalonate; dimethyl butylidenemalonate, diethyl butylidenemalonate, di-n-propyl butylidenemalonate, diisobutyl butylidenemalonate, and di-n-butyl butylidenemalonate; dimethyl pentylidenemalonate, diethyl pentylidenemalonate, di-n-propyl pentylidenemalonate, diisobutyl pentylidenemalonate, and di-n-butyl pentylidenemalonate; dimethyl hexylidenemalonate, diethyl hexylidenemalonate, di-n-propyl hexylidenemalonate, diisobutyl hexylidenemalonate, and di-n-butyl hexylidenemalonate; dimethyl(2-methylpropylidene)malonate, diethyl(2-methylpropylidene)malonate, di-n-propyl(2-methylpropylidene)malonate, diisobutyl(2-methylpropylidene)malonate, di-n-butyl(2-methylpropylidene)malonate, and diethyl(2,2-dimethylpropylidene)malonate;

dimethyl(2-methylbutylidene)malonate, diethyl(2-methylbutylidene)malonate, di-n-propyl(2-methylbutylidene)malonate, diisobutyl(2-methylbutylidene)malonate, and di-n-butyl(2-methylbutylidene)malonate; dimethyl(2-ethylbutylidene)malonate, diethyl(2-ethylbutylidene)malonate, di-n-propyl(2-ethylbutylidene)malonate, diisobutyl(2-ethylbutylidene)malonate, and di-n-butyl(2-ethylbutylidene)malonate; dimethyl(2-ethylpentylidene)malonate, diethyl(2-ethylpentylidene)malonate, di-n-propyl(2-ethylpentylidene)malonate, diisobutyl(2-ethylpentylidene)malonate, and di-n-butyl(2-ethylpentylidene)malonate; dimethyl(2-isopropylbutylidene)malonate, diethyl(2-isopropylbutylidene)malonate, di-n-propyl(2-isopropylbutylidene)malonate, diisobutyl(2-isopropylbutylidene)malonate, and di-n-butyl(2-isopropylbutylidene)malonate; dimethyl(3-methylbutylidene)malonate, diethyl(3-methylbutylidene)malonate, di-n-propyl(3-methylbutylidene)malonate, diisobutyl(3-methylbutylidene)malonate, and di-n-butyl(3-methylbutylidene)malonate;

dimethyl(2,3-dimethylbutylidene)malonate, diethyl(2,3-dimethylbutylidene)malonate, di-n-propyl(2,3-dimethylbutylidene)malonate, diisobutyl(2,3-dimethylbutylidene)malonate, and di-n-butyl(2,3-dimethylbutylidene)malonate; dimethyl(2-n-propylbutylidene)malonate, diethyl(2-n-propylbutylidene)malonate, di-n-propyl(2-n-propylbutylidene)malonate, diisobutyl(2-n-propylbutylidene)malonate, and di-n-butyl(2-n-propylbutylidene)malonate; dimethyl(2-isobutyl-3-methylbutylidene)malonate, diethyl(2-isobutyl-3-methylbutylidene)malonate, di-n-propyl(2-isobutyl-3-methylbutylidene)malonate, diisobutyl(2-isobutyl-3-methylbutylidene)malonate, and di-n-butyl(2-isobutyl-3-methylbutylidene)malonate; dimethyl(2-n-butylpentylidene)malonate, diethyl(2-n-butylpentylidene)malonate, di-n-propyl(2-n-butylpentylidene)malonate, diisobutyl(2-n-butylpentylidene)malonate, and di-n-butyl(2-n-butylpentylidene)malonate; dimethyl(2-n-pentylhexylidene)malonate, diethyl(2-n-pentylhexylidene)malonate, di-n-propyl(2-n-pentylhexylidene)malonate, diisobutyl(2-n-pentylhexylidene)malonate, and di-n-butyl(2-n-pentylhexylidene)malonate;

dimethyl(cyclohexylmethylene)malonate, diethyl(cyclohexylmethylene)malonate, di-n-propyl(cyclohexylmethylene)malonate, diisobutyl(cyclohexylmethylene)malonate, and di-n-butyl(cyclohexylmethylene)malonate; dimethyl(cyclopentylmethylene)malonate, diethyl(cyclopentylmethylene)malonate, di-n-propyl(cyclopentylmethylene)malonate, diisobutyl(cyclopentylmethylene)malonate, and di-n-butyl(cyclopentylmethylene)malonate; dimethyl(1-methylpropylidene)malonate, diethyl(1-methylpropylidene)malonate, di-n-propyl(1-methylpropylidene)malonate, diisobutyl(1-methylpropylidene)malonate, and di-n-butyl(1-methylpropylidene)malonate; dimethyl(di-t-butylmethylene)malonate, diethyl(di-t-butylmethylene)malonate, di-n-propyl(di-t-butylmethylene)malonate, diisobutyl(di-t-butylmethylene)malonate, and di-n-butyl(di-t-butylmethylene)malonate; dimethyl(diisobutylmethylene)malonate, diethyl(diisobutylmethylene)malonate, di-n-propyl(diisobutylmethylene)malonate, diisobutyl(diisobutylmethylene)malonate, and di-n-butyl(diisobutylmethylene)malonate; dimethyl(diisopropylmethylene)malonate, diethyl(diisopropylmethylene)malonate, di-n-propyl(diisopropylmethylene)malonate, diisobutyl(diisopropylmethylene)malonate, and di-n-butyl(diisopropylmethylene)malonate; dimethyl(dicyclopentylmethylene)malonate, diethyl(dicyclopentylmethylene)malonate, di-n-propyl(dicyclopentylmethylene)malonate, diisobutyl(dicyclopentylmethylene)malonate, and di-n-butyl(dicyclopentylmethylene)malonate; dimethyl(dicyclohexylmethylene)malonate, diethyl(dicyclohexylmethylene)malonate, di-n-propyl(dicyclohexylmethylene)malonate, diisobutyl(dicyclohexylmethylene)malonate, and di-n-butyl(dicyclohexylmethylene)malonate;

dimethyl benzylidenemalonate, diethyl benzylidenemalonate, di-n-propyl benzylidenemalonate, diisobutyl benzylidenemalonate, and di-n-butyl benzylidenemalonate; dimethyl(1-methylbenzylidene)malonate, diethyl(1-methylbenzylidene)malonate, di-n-propyl(1-methylbenzylidene)malonate, diisobutyl(1-methylbenzylidene)malonate, and di-n-butyl(1-methylbenzylidene)malonate; dimethyl(1-ethylbenzylidene)malonate, diethyl(1-ethylbenzylidene)malonate, di-n-propyl(1-ethylbenzylidene)malonate, diisobutyl(1-ethylbenzylidene)malonate, and di-n-butyl(1-ethylbenzylidene)malonate; dimethyl(1-n-propylbenzylidene)malonate, diethyl(1-n-propylbenzylidene)malonate, di-n-propyl(1-n-propylbenzylidene)malonate, diisobutyl(1-n-propylbenzylidene)malonate, and di-n-butyl(1-n-propylbenzylidene)malonate; dimethyl(1-isopropylbenzylidene)malonate, diethyl(1-isopropylbenzylidene)malonate, di-n-propyl(1-isopropylbenzylidene)malonate, diisobutyl(1-isopropylbenzylidene)malonate, and di-n-butyl(1-isopropylbenzylidene)malonate;

dimethyl(1-n-butylbenzylidene)malonate, diethyl(1-n-butylbenzylidene)malonate, di-n-propyl(1-n-butylbenzylidene)malonate, diisobutyl(1-n-butylbenzylidene)malonate, and di-n-butyl(1-n-butylbenzylidene)malonate; dimethyl(1-isobutylbenzylidene)malonate, diethyl(1-isobutylbenzylidene)malonate, di-n-propyl(1-isobutylbenzylidene)malonate, diisobutyl(1-isobutylbenzylidene)malonate, and di-n-butyl(1-isobutylbenzylidene)malonate; dimethyl(1-t-butylbenzylidene)malonate, diethyl(1-t-butylbenzylidene)malonate, di-n-propyl(1-t-butylbenzylidene)malonate, diisobutyl(1-t-butylbenzylidene)malonate, and di-n-butyl(1-t-butylbenzylidene)malonate; dimethyl(1-n-pentylbenzylidene)malonate, diethyl(1-n-pentylbenzylidene)malonate, di-n-propyl(1-n-pentylbenzylidene)malonate, diisobutyl(1-n-pentylbenzylidene)malonate, and di-n-butyl(1-n-pentylbenzylidene)malonate; dimethyl(2-methylphenylmethylene)malonate, diethyl(2-methylphenylmethylene)malonate, di-n-propyl(2-methylphenylmethylene)malonate, diisobutyl(2-methylphenylmethylene)malonate, and di-n-butyl(2-methylphenylmethylene)malonate;

dimethyl(2,6-dimethylphenylmethylene)malonate, diethyl (2,6-dimethylphenylmethylene)malonate, di-n-propyl(2,6-dimethylphenylmethylene)malonate, diisobutyl(2,6-dimethylphenylmethylene)malonate, and di-n-butyl(2,6-dimethylphenylmethylene)malonate; dimethyl(1-methyl-1-(2-methylphenyl)methylene)malonate, diethyl(1-methyl-1-(2-methylphenyl)methylene)malonate, di-n-propyl(1-methyl-1-(2-methylphenyl)methylene)malonate, diisobutyl (1-methyl-1-(2-methylphenyl)methylene)malonate, and di-n-butyl(1-methyl-1-(2-methylphenyl)methylene)malonate; dimethyl(2-methylcyclohexylmethylene)malonate, diethyl(2-methylcyclohexylmethylene)malonate, di-n-propyl(2-methylcyclohexylmethylene)malonate, diisobutyl(2-methylcyclohexylmethylene)malonate, and di-n-butyl(2-methylcyclohexylmethylene)malonate; dimethyl(2,6-dimethylcyclohexylmethylene)malonate, diethyl(2,6-dimethylcyclohexylmethylene)malonate, di-n-propyl(2,6-dimethylcyclohexylmethylene)malonate, diisobutyl(2,6-dimethylcyclohexylmethylene)malonate, and di-n-butyl(2,6-dimethylcyclohexylmethylene)malonate; dimethyl(1-methyl-1-(2-methylcyclohexyl)methylene)malonate, diethyl (1-methyl-1-(2-methylcyclohexyl)methylene)malonate, di-n-propyl(1-methyl-1-(2-methylcyclohexyl)methylene) malonate, diisobutyl(1-methyl-1-(2-methylcyclohexyl)methylene)malonate, and di-n-butyl(1-methyl-1-(2-methylcyclohexyl)methylene)malonate; dimethyl(naphthylmethylene)malonate, diethyl(naphthylmethylene)malonate, di-n-propyl(naphthylmethylene)malonate, diisobutyl(naphthylmethylene)malonate, and di-n-butyl(naphthylmethylene)malonate; dimethyl(1-n-hexylbenzylidene)malonate, diethyl(1-n-hexylbenzylidene) malonate, di-n-propyl(1-n-hexylbenzylidene)malonate, diisobutyl(1-n-hexylbenzylidene)malonate, and di-n-butyl (1-n-hexylbenzylidene)malonate. These compounds may be used either alone or in combination.

The solid catalyst component (I) may include an electron donor compound other than the ester compound (A) represented by the general formula (1) (hereinafter may be referred to as "electron donor compound (D)"). Examples of the electron donor compound (D) include acid halides, acid amides, nitriles, acid anhydrides, carbonates, ether compounds, carboxylic esters other than the ester compound (A), and the like. It is preferable to use a solid catalyst component prepared using the ester compound (A) and the component (D) selected from carboxylic diesters such as succinic diesters, cycloalkanedicarboxylic diesters, cycloalkenedicarboxylic diesters, malonic diesters, alkyl-substituted malonic diesters, and maleic diesters, substituted carboxylic diesters, compounds that include an ester group and an ether group, and diether compounds, since the stereoregularity of the resulting olefin polymer can be improved, and the molecular weight distribution and the hydrogen response can be controlled within the desired range in the same manner as in the case of preparing a solid catalyst component using a phthalic ester and another electron donor.

Malonic diesters such as dimethyl malonate and diethyl malonate, dialkylmalonic diesters such as dimethyl diisobutylmalonate and diethyl diisobutylmalonate, maleic diesters such as diethyl maleate and di-n-butyl maleate, cycloalkanedicarboxylic diesters such as dimethyl cyclohexane-1,2-dicarboxylate, and 1,3-diethers such as 9,9-bis(methoxymethyl)fluorene are particularly preferable as the component (D). These electron donor compounds (D) may be used in combination.

The solid catalyst component (I) may include a polysiloxane (hereinafter may be referred to as "polysiloxane (E)"). The stereoregularity or the crystallinity of the resulting polymer can be improved, and production of a fine powder can be reduced by utilizing the polysiloxane. A polysiloxane is a polymer that includes a siloxane linkage (—Si—O—) in the main chain, and is also referred to as "silicone oil". The solid catalyst component (I) may include a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of the chain-like polysiloxane include dimethylpolysiloxane and methylphenylpolysiloxane. Examples of the partially hydrogenated polysiloxane include methyl hydrogen polysiloxanes having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, and the like.

The content of titanium, magnesium, the halogen, and the ester compound (A) in the solid catalyst component (I) is not particularly limited. The content of titanium in the solid catalyst component (I) is 0.1 to 10 wt %, preferably 0.5 to 8.0 wt %, and still more preferably 1.0 to 8.0 wt %. The content of magnesium in the solid catalyst component (I) is 10 to 70 wt %, preferably 10 to 50 wt %, more preferably 15 to 40 wt %, and particularly preferably 15 to 25 wt %. The content of the halogen in the solid catalyst component (I) is 20 to 90 wt %, preferably 30 to 85 wt %, more preferably 40 to 80 wt %, and particularly preferably 45 to 75 wt %. The total content of the ester compound (A) is 0.5 to 40 wt %, preferably 1 to 30 wt %, and particularly preferably 2 to 25 wt %. When the solid catalyst component (I) includes the component (D), the ratio of the content of the component (D) to the content of the ester compound (A) is 0.01 to 10:1 (mol), preferably 0.1 to 1:1 (mol), and more preferably 0.2 to 0.6:1 (mol).

The solid catalyst component (I) may include a reagent that includes silicon, phosphorus, or a metal (e.g., aluminum) in addition to the above components. Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component and the stereoregularity can be improved.

Examples and specific examples of the organosilicon compound that includes an Si—O—C linkage and the organosilicon compound that includes an Si—N—C linkage include those mentioned later in connection with the organosilicon compound represented by the general formula (3) and the organosilicon compound represented by the general formula (4). Examples of the organoaluminum compound include those mentioned later in connection with the organoaluminum compound represented by the general formula (2). These reagents may be used either alone or in combination.

The solid catalyst component (I) that includes the reagent may further include an organosilicon compound represented by the following general formula (7) that includes an unsaturated alkyl group.

wherein $R^{20}$ is a hydrogen atom, an alkyl group having 1 to 20 carbon atoms, a cycloalkyl group, a phenyl group, a vinyl group, or a halogen atom, provided that a plurality of $R^{20}$ may be either identical or different when a plurality of $R^{20}$ are present, u is an integer from 0 to 5, and t is an integer from 1 to 4. In this case, the polymerization activity of the resulting solid catalyst component and the hydrogen response can be further improved.

The unsaturated alkyl group refers to a vinyl group or an alkenyl group. Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenylsilane, dimethylsilane, diallyldichlorosilane, and allyltriethylsilane are particularly preferable. These organosilicon compounds that include an unsaturated alkyl group may be used either alone or in combination.

Method for Producing Solid Catalyst Component (I) for Olefin Polymerization

The solid catalyst component (I) for olefin polymerization according to one embodiment of the invention is produced by bringing a magnesium compound, a titanium compound, an optional halogen compound other than the titanium compound, the ester compound (A) represented by the general formula (1), and the optional electron donor compound (D) into contact with each other.

Examples of the magnesium compound used to produce the solid catalyst component according to one embodiment of the invention (hereinafter may be referred to as "magnesium compound (B)") include one or more magnesium compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be prepared by reacting magnesium metal with an alcohol in the presence of a halogen, a halogen-containing metal compound, or the like. The dialkoxymagnesiums may be used either alone or in combination.

It is preferable to use a granular or powdery dialkoxymagnesium when producing the solid catalyst component according to one embodiment of the invention. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by fine particles contained in the polymer powder.

The spherical dialkoxymagnesium need not necessarily have a perfect spherical shape, but may have an elliptical shape or a potato-like shape. The ratio (l/w) of the major axis diameter (l) to the minor axis diameter (w) of the spherical dialkoxymagnesium is 3 or less, preferably 1 to 2, and more preferably 1 to 1.5.

The average particle size D50 (i.e., the particle size at 50% in the cumulative volume particle size distribution) of the dialkoxymagnesium measured using a laser diffraction/scattering particle size distribution analyzer is preferably 1 to 200 μm, and more preferably 5 to 150 μm. The average particle size of the spherical dialkoxymagnesium is preferably 1 to 100 μm, more preferably 5 to 50 μm, and still more preferably 10 to 40 μm. It is preferable that the spherical dialkoxymagnesium have a narrow particle size distribution, and have a low fine particle content and a low coarse particle content. More specifically, it is preferable that the content of particles having a particle size (measured using a laser diffraction/scattering particle size distribution analyzer) of 5 μm or less in the spherical dialkoxymagnesium be 20% or less, and more preferably 10% or less. It is preferable that the content of particles having a particle size of 100 μm or more in the spherical dialkoxymagnesium be 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the spherical dialkoxymagnesium is preferably 3 or less, and more preferably 2 or less.

The spherical dialkoxymagnesium may be produced using the method disclosed in JP-A-58-41832, JP-A-62-51633, JP-A-3-74341, JP-A-4-368391, JP-A-8-73388, or the like.

The magnesium compound (B) may be used in the form of a magnesium compound solution or a magnesium compound suspension. When the magnesium compound (B) is solid, the magnesium compound (B) is dissolved in a solvent that can dissolve the magnesium compound (B) to prepare a magnesium compound solution, or suspended in a solvent that cannot dissolve the magnesium compound (B) to prepare a magnesium compound suspension. When the magnesium compound (B) is liquid, the magnesium compound (B) may be used directly as a magnesium compound solution, or may be dissolved in a solvent that can dissolve the magnesium compound (B) to prepare a magnesium compound solution.

Examples of a compound that can dissolve the magnesium compound (B) include at least one compound selected from the group consisting of alcohols, ethers, and esters. Specific examples of the compound that can dissolve the magnesium compound (B) include alcohols having 1 to 18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol; halogen-containing alcohols having 1 to 18 carbon atoms such as trichloromethanol, trichloroethanol, and trichlorohexanol; ethers having 2 to 20 carbon atoms such as methyl ether, ethyl ether, isopropyl ether, butyl ether, amyl ether, tetrahydrofuran, ethyl benzyl ether, dibutyl ether, anisole, and diphenyl ether; metal acid esters such as tetraethoxytitanium, tetra-n-propoxytitanium, tetraisopropoxytitanium, tetrabutoxytitanium, tetrahexoxytitanium, tetrabutoxyzirconium, and tetraethoxyzirconium; and the like. Among these, alcohols such as ethanol, propanol, butanol, and 2-ethylhexanol are preferable, and 2-ethylhexanol is particularly preferable.

A saturated hydrocarbon solvent or an unsaturated hydrocarbon solvent that does not dissolve a magnesium compound is used as a medium that cannot dissolve the magnesium compound (B). The saturated hydrocarbon solvent or the unsaturated hydrocarbon solvent is safe and has high industrial versatility. Examples of the saturated hydrocarbon solvent or the unsaturated hydrocarbon solvent include linear or branched aliphatic hydrocarbon compounds having a boiling point of 50 to 200° C., such as hexane, heptane, decane, and methylheptane, alicyclic hydrocarbon compounds having a boiling point of 50 to 200° C., such as cyclohexane, ethylcyclohexane, and decahydronaphthalene, and aromatic hydrocarbon compounds having a boiling point of 50 to 200° C., such as toluene, xylene, and ethylbenzene. Among these, linear aliphatic hydrocarbon compounds having a boiling point of 50 to 200° C., such as hexane, heptane, and decane, and aromatic hydrocarbon compounds having a boiling point of 50 to 200° C., such as toluene, xylene, and ethylbenzene are preferable. These solvents may be used either alone or in combination.

Examples of the titanium compound used to produce the component (I) according to one embodiment of the invention (hereinafter may be referred to as "titanium compound (C)") include a tetravalent titanium compound represented by the following general formula (6).

wherein $R^{19}$ is a hydrocarbon group having 1 to 10 carbon atoms, provided that a plurality of $R^{19}$ may be either identical or different when a plurality of $OR^{19}$ are present, X is a halogen atom, provided that a plurality of X may be either identical or different when a plurality of X are present, and j is an integer from 0 to 4.

The tetravalent titanium compound represented by the general formula (6) is one compound or two or more compounds selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (6) may be used in a state in which the tetravalent titanium compound is diluted with a hydrocarbon compound, a halogenated hydrocarbon compound, or the like.

A halogen compound other than the titanium compound (C) may optionally be used to produce the solid catalyst component (I) according to one embodiment of the invention. Examples of the halogen compound include tetravalent halogen-containing silicon compounds. Specific examples of the halogen compound include silane tetrahalides such as tetrachlorosilane (silicon tetrachloride) and tetrabromosilane, and alkoxy group-containing halogenated silanes such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

The ester compound (A) used to produce the solid catalyst component (I) according to one embodiment of the invention is the same as the ester compound (A) included in the solid catalyst component (I) according to one embodiment of the invention. Therefore, description thereof is omitted. The electron donor compound (D) that is optionally used to produce the solid catalyst component (I) according to one embodiment of the invention is the same as the electron donor compound (D) that is optionally included in the solid catalyst component (I) according to one embodiment of the invention. Therefore, description thereof is omitted. The polysiloxane (E) that is optionally used to produce the solid catalyst component (I) according to one embodiment of the invention is the same as the polysiloxane (E) that is optionally included in the solid catalyst component (I) according to one embodiment of the invention. Therefore, description thereof is omitted.

The solid catalyst component (I) may preferably be produced by a method that co-grinds a solid magnesium compound that does not have a reducing capability, the ester compound (A), and a titanium halide, a method that brings a magnesium halide compound that includes an alcohol or the like, the ester compound (A), and a titanium halide into contact with each other in the presence of an inert hydrocarbon solvent, a method that brings a dialkoxymagnesium, the ester compound (A), and a titanium halide into contact with each other in the presence of an inert hydrocarbon solvent, a method that brings a magnesium compound having a reducing capability, the ester compound (A), and a titanium halide into contact with each other to precipitate a solid catalyst, or the like.

Specific examples of the method for producing the solid catalyst component (I) for olefin polymerization are described below. In the following methods (1) to (16), the electron donor compound (D) other than the ester compound (A) may be used in combination with the ester compound (A). The components may be brought into contact with each other in the presence of a reagent (e.g., silicon, phosphorus, or aluminum) and a surfactant.

(1) A magnesium halide is dissolved in an alkoxytitanium compound, and an organosilicon compound is brought into contact with the solution to obtain a solid product. The solid product is reacted with a titanium halide, and the ester compound (A) is reacted with the resulting product to produce the solid catalyst component (I) for olefin polymerization. In this case, the component (1) may be subjected to preliminary polymerization using an organoaluminum compound, an organosilicon compound, and an olefin.

(2) A magnesium halide and an alcohol are reacted to obtain a homogeneous solution, and a carboxylic anhydride is brought into contact with the homogeneous solution. A titanium halide and the ester compound (A) are reacted with the solution to obtain a solid, and a titanium halide is brought into contact with the solid to produce the solid catalyst component (I) for olefin polymerization.

(3) Magnesium metal, butyl chloride, and a dialkyl ether are reacted to synthesize an organomagnesium compound, and an alkoxytitanium is reacted with the organomagnesium compound to obtain a solid product. The ester compound (A) and a titanium halide are reacted with the solid product to produce the solid catalyst component (I) for olefin polymerization. In this case, the solid component may be subjected to preliminary polymerization using an organoaluminum compound, an organosilicon compound, and an olefin to produce the solid catalyst component (I) for olefin polymerization.

(4) An organomagnesium compound such as a dialkylmagnesium and an organoaluminum compound are reacted with an alcohol in the presence of a hydrocarbon solvent to obtain a homogeneous solution, and a silicon compound such as silicon tetrachloride is brought into contact with the solution to obtain a solid product. A titanium halide and the ester compound (A) are reacted with the solid product in the presence of an aromatic hydrocarbon solvent, and titanium tetrachloride is brought into contact with the resulting product to produce the solid catalyst component (I) for olefin polymerization.

(5) Magnesium chloride, a tetraalkoxytitanium, and a fatty alcohol are reacted in the presence of a hydrocarbon solvent to obtain a homogeneous solution, and a titanium halide is brought into contact with the solution. The mixture is then heated to precipitate a solid, and the ester compound (A) is brought into contact with the solid. The mixture is then reacted with a titanium halide to produce the solid catalyst component (I) for olefin polymerization.

(6) A magnesium metal powder, an alkylmonohalogen compound, and iodine are reacted, and a tetraalkoxytitanium, an acid halide, and a fatty alcohol are reacted with the mixture in the presence of a hydrocarbon solvent to obtain a homogeneous solution. After the addition of titanium tetrachloride to the solution, the mixture is heated to precipitate a solid, and the ester compound (A) is brought into contact with the solid. The mixture is then reacted with titanium tetrachloride to produce the solid catalyst component (I) for olefin polymerization.

(7) A dialkoxymagnesium is suspended in a hydrocarbon solvent, and brought into contact with titanium tetrachloride. The mixture is heated, and brought into contact with the ester compound (A) to obtain a solid product. The solid product is washed with a hydrocarbon solvent, and brought into contact with titanium tetrachloride in the presence of a hydrocarbon solvent to produce the solid catalyst component (I) for olefin polymerization. In this case, the solid component may be heated in the presence or absence of a hydrocarbon solvent.

(8) A dialkoxymagnesium is suspended in a hydrocarbon solvent, and brought into contact with a titanium halide and the ester compound (A) to obtain a solid product. The solid product is washed with an inert organic solvent, and brought into contact with a titanium halide in the presence of a hydrocarbon solvent to produce the solid catalyst component (I) for olefin polymerization. In this case, the solid component and a titanium halide may be brought into contact with each other two or more times.

(9) A dialkoxymagnesium, calcium chloride, and an alkoxy group-containing silicon compound are co-ground. The resulting ground solid is suspended in a hydrocarbon solvent, and reacted with a titanium halide and the ester compound (A). A titanium halide is brought into contact with the mixture to produce the solid catalyst component (I) for olefin polymerization.

(10) A dialkoxymagnesium and the ester compound (A) are suspended in a hydrocarbon solvent, and brought into contact (reacted) with a titanium halide to obtain a solid product. The solid product is washed with a hydrocarbon solvent, and brought into contact with a titanium halide in the presence of a hydrocarbon solvent to produce the solid catalyst component (I) for olefin polymerization.

(11) An aliphatic magnesium such as magnesium stearate is reacted with a titanium halide and the ester compound (A). A titanium halide is then brought into contact with the mixture to produce the solid catalyst component (I) for olefin polymerization.

(12) A dialkoxymagnesium is suspended in a hydrocarbon solvent, and brought into contact with a titanium halide. The mixture is heated, and reacted with the ester compound (A) to obtain a solid product. The solid product is washed with a hydrocarbon solvent, and brought into contact with a titanium halide in the presence of a hydrocarbon solvent to produce the solid catalyst component (I) for olefin polymerization, wherein aluminum chloride is brought into contact in the suspension/contact step or the contact/reaction step.

(13) A dialkoxymagnesium, 2-ethylhexyl alcohol, and carbon dioxide are reacted in the presence of a hydrocarbon solvent to obtain a homogeneous solution. A titanium halide and the ester compound (A) are reacted with the solution to obtain a solid. The solid is dissolved in tetrahydrofuran, and a solid product is precipitated. A titanium halide is reacted with the solid product (optionally two or more times) to produce the solid catalyst component (I) for olefin polymerization. A silicon compound such as tetrabutoxysilane may be used in the contact step, the contact/reaction step, or the dissolution step.

(14) Magnesium chloride, an organic epoxy compound, and a phosphoric acid compound are suspended in a hydrocarbon solvent, and heated to obtain a homogeneous solution. A carboxylic anhydride and a titanium halide are reacted with the solution to obtain a solid product. The ester compound (A) is reacted with the solid product, and the resulting reaction product is washed with a hydrocarbon solvent. A titanium halide is brought into contact with the reaction product to produce the solid catalyst component (I) for olefin polymerization.

(15) A dialkoxymagnesium, a titanium compound, and the ester compound (A) are reacted in the presence of a hydrocarbon solvent, and a silicon compound such as polysiloxane is reacted with the resulting reaction product. A titanium halide and a metal salt of an organic acid are sequentially reacted with the mixture, and a titanium halide is brought into contact with the mixture to produce the solid catalyst component (I) for olefin polymerization.

(16) A dialkoxymagnesium and the ester compound (A) are suspended in a hydrocarbon solvent. The suspension is heated, and brought into contact with a silicon halide. The mixture is brought into contact with a titanium halide to obtain a solid product. The solid product is washed with a hydrocarbon solvent, and brought into contact with a titanium halide in the presence of a hydrocarbon solvent to produce the solid catalyst component (I) for olefin polymerization. In this case, the solid component may be heated in the presence or absence of a hydrocarbon solvent.

In the methods (1) to (16), a titanium halide and a hydrocarbon solvent may be brought into contact with the washed solid catalyst component (I) at 20 to 100° C., the mixture may be heated to effect a reaction (secondary reaction), and washed with an inert organic solvent that is liquid at room temperature, and the above operation may be repeated 1 to 10 times in order to further improve the polymerization activity when polymerizing the olefin and the stereoregularity of the resulting polymer.

The component (I) according to one embodiment of the invention may suitably be produced using any of the methods (1) to (16). It is preferable to use the method (1), (3), (4), (5), (7), (8), or (10), and particularly preferably the method (3), (4), (7), (8), or (10) since a solid catalyst component for olefin polymerization that ensures high stereoregularity can be obtained. It is most preferable to produce the solid catalyst component (I) for olefin polymerization by suspending a dialkoxymagnesium and the ester compound (A) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing a titanium halide into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), and the organosilicon compound represented by the general formula (7) (optional). The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with the above compounds.

The solid catalyst component (I) is brought into contact with each component at a temperature of −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, the organosilicon compound that includes an Si—N—C linkage, and the organosilicon compound represented by the general formula (7) are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is ⅓ or less, and preferably ⅙ to 1/20 to obtain a powdery solid component, and remove a fine powder having a particle size of 11 μm or less from the powdery solid component by air classification or the like.

The ratio of the components when producing the solid catalyst component (I) is determined depending on the production method. For example, the tetravalent titanium halide compound (C) is used in an amount of 0.5 to 100 mol, preferably 0.5 to 50 mol, and still more preferably 1 to 10 mol, based on 1 mol of the magnesium compound (B). The ester compound (A), or a combination of the ester compound (A) and the electron donor compound (D), is used in an amount of 0.01 to 10 mol, preferably 0.01 to 1 mol, and still more preferably 0.02 to 0.6 mol, based on 1 mol of the magnesium compound (B). The solvent is used in an amount of 0.001 to 500 mol, preferably 0.001 to 100 mol, and still more preferably 0.005 to 10 mol, based on 1 mol of the magnesium compound (i). The polysiloxane (E) is used in an amount of 0.01 to 100 g, preferably 0.05 to 80 g, and still more preferably 1 to 50 g, based on 1 mol of the magnesium compound (i).

Olefin Polymerization Catalyst

An olefin polymerization catalyst according to one embodiment of the invention is produced by bringing the solid catalyst component (I), (II) an organoaluminum compound (hereinafter may be referred to as "organoaluminum compound (F)"), and (III) an external electron donor compound (hereinafter may be referred to as "external electron donor compound (G)") into contact with each other. An olefin can be polymerized or copolymerized in the presence of the catalyst. Note that the external electron donor compound (G) may not be used when the solid catalyst component (I) includes the organosilicon compound that includes an Si—O—C linkage, the organosilicon compound that includes an Si—N—C linkage, or the organoaluminum compound (reagent), or when the solid catalyst component that includes the reagent further includes the organosilicon compound represented by the general formula (7). Specifically, the catalyst formed by the solid catalyst component and the organoaluminum compound ensures excellent polymerization activity and hydrogen response even when the external electron donor compound (G) is not used.

Examples of the organoaluminum compound (II) include a compound represented by the following general formula (2).

$$R^5_p AlQ_{3-p} \quad (2)$$

wherein $R^5$ is a linear or branched alkyl group having 1 to 6 carbon atoms, Q is a hydrogen atom or a halogen, and p is a real number that satisfies $0 < p \leq 3$. It is preferable that $R^5$ be an ethyl group or an isobutyl group, Q be a hydrogen atom, a chlorine atom, or a bromine atom, and q be 2 or 3 (particularly preferably 3).

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the olefin polymerization catalyst according to one embodiment of the invention include organic compounds that include an oxygen atom or a nitrogen atom. Examples of the organic compounds that include an oxygen atom or a nitrogen atom include alcohols, phenols, ethers, esters, ketones, acid halides, aldehydes, amines, amides, nitriles, isocyanates, and organosilicon compounds. The external electron donor compound (III) may be an organosilicon compound that includes an Si—O—C linkage, an aminosilane compound that includes an Si—N—C linkage, or the like. The ester compound (A) may be used as the ester.

Among these, esters such as ethyl benzoate, ethyl p-methoxybenzoate, ethyl p-ethoxybenzoate, methyl p-toluate, ethyl p-toluate, methyl anisate, and ethyl anisate, 1,3-diethers, organosilicon compounds that include an Si—O—C linkage, and aminosilane compounds that include an Si—N—C linkage are preferable, and organosilicon compounds that include an Si—O—C linkage, aminosilane compounds that include an Si—N—C linkage, and 1,3-diethers are particularly preferable.

Examples of the organosilicon compounds that include an Si—O—C linkage and may be used as the external electron donor compound (III) include an organosilicon compound represented by the following general formula (3).

$$R^6_p Si(OR^7)_{4-q} \tag{3}$$

wherein $R^6$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms, provided that a plurality of $R^6$ are either identical or different when a plurality of $R^6$ are present, $R^7$ is an alkyl group having 1 to 4 carbon atoms, a cycloalkyl group having 3 to 6 carbon atoms, a phenyl group, a vinyl group, an allyl group, or an aralkyl group, provided that a plurality of $R^7$ are either identical or different when a plurality of $R^7$ are present, and q is an integer that satisfies $0 \le q \le 3$.

Examples of the aminosilane compounds that include an Si—N—C linkage and may be used as the external electron donor compound (III) include an aminosilane compound represented by the following general formula (4).

$$(R^8 R^9 N)_s SiR^{10}_{4-s} \tag{4}$$

wherein $R^8$ and $R^9$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^8$ and $R^9$ are either identical or different, and optionally bond to each other to form a ring, $R^{10}$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group, or a derivative thereof, provided that a plurality of $R^{10}$ are either identical or different when a plurality of $R^{10}$ are present, and s is an integer from 1 to 3.

Examples of the organosilicon compound include a phenylalkoxysilane, an alkylalkoxysilane, a phenylalkylalkoxysilane, a cycloalkylalkoxysilane, an alkyl(cycloalkyl)alkoxysilane, an (alkylamino)alkoxysilane, an alkyl(alkylamino)alkoxysilane, a cycloalkyl(alkylamino)alkoxysilane, a tetraalkoxysilane, a tetrakis(alkylamino)silane, an alkyltris(alkylamino)silane, a dialkylbis(alkylamino)silane, a trialkyls(alkylamino)silane, and the like. Specific examples of the organosilicon compound include phenyltrimethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. Among these, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like are preferable.

Examples of the 1,3-diethers that may be used as the external electron donor compound (III) include a 1,3-diether compound represented by the following general formula (5).

$$R^{11}R^{12}R^{13}COCH_2(R^{17}R^{18}C)CH_2OCR^{14}R^{15}R^{16} \tag{5}$$

wherein $R^{11}$ to $R^{16}$ are a hydrogen atom, a linear alkyl group having 1 to 6 carbon atoms, a branched alkyl group having 3 to 6 carbon atoms, a cycloalkyl group having 3 to 6 carbon atoms, or a phenyl group, provided that $R^{11}$ to $R^{16}$ are either identical or different, and $R^{17}$ and $R^{18}$ are a hydrogen atom, a linear alkyl group having 1 to 6 carbon atoms, a branched alkyl group having 3 to 6 carbon atoms, a cycloalkyl group having 3 to 6 carbon atoms, or a phenyl group, provided that $R^{17}$ and $R^{18}$ are either identical or different, and optionally bond to each other to form a ring.

Specific examples of the 1,3-diether compounds include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 9,9-bis(methoxymethyl)fluorene, and the like are preferable.

The external electron donor compound (III) may be one compound or two or more compounds selected from the organosilicon compound represented by the general formula (3), the organosilicon compound represented by the general formula (4), and the diether compound represented by the general formula (5).

Method for Polymerizing Olefin

In one embodiment of the invention, an olefin is polymerized or copolymerized in the presence of the olefin polymerization catalyst. Examples of the olefin include ethylene, propylene, 1-butene, 1-pentene, 4-methyl-1-pentene, vinylcyclohexane, and the like. These olefins may be used either individually or in combination. Among these, ethylene, propylene, and 1-butene are preferable. A particularly preferable olefin is propylene.

When polymerizing propylene, propylene may be copolymerized with another olefin. Examples of the olefin copolymerized with propylene include ethylene, 1-butene, 1-pentene, 4-methyl-1-pentene, vinylcyclohexane, and the like. These olefins may be used either individually or in combination. Among these, ethylene and 1-butene are preferable.

The ratio of each component is not particularly limited as long as the advantageous effects of the invention are not adversely affected. The organoaluminum compound (F) is normally used in an amount of 1 to 2000 mol, and preferably 50 to 1000 mol, per mol of the titanium atoms included in the solid catalyst component (I). The external electron donor compound (G) is used in an amount of 0.002 to 10 mol, preferably 0.01 to 2 mol, and particularly preferably 0.01 to 0.5 mol, per one mol of the organoaluminum compound (F).

The components may be brought into contact with each other in an arbitrary order. It is desirable to add the organoaluminum compound (F) to the polymerization system, bring the external electron donor compound (G) into contact with the organoaluminum compound (F), and bring the solid catalyst component (I) into contact with the mixture. The olefin may be polymerized in the presence or absence of an organic solvent. The olefin monomer such as propylene may be used either in a gaseous state or a liquid state. The polymerization temperature is 200° C. or less, and preferably 100° C. or less. The polymerization pressure is 10 MPa or less, and preferably 5 MPa or less. A continuous polymerization method or a batchwise polymerization method may be used. The polymerization reaction may be effected in one step, or two or more steps.

When polymerizing the olefin using the catalyst that includes the solid catalyst component for olefin polymerization, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the organoaluminum compound (F) to the preliminary polymerization system containing an inert gas atmosphere or an olefin gas atmosphere, bring the solid catalyst component (I) into contact with the organoaluminum compound (F), and then bring the olefin (e.g., propylene) or a mixture of propylene and one or more additional olefins into contact with the mixture.

When effecting the preliminary polymerization using the external electron donor compound (G), it is desirable to add the organoaluminum compound (F) to the preliminary polymerization system containing an inert gas atmosphere or an olefin gas atmosphere, bring the external electron donor compound (G) into contact with the organoaluminum compound (F), bring the solid catalyst component (I) into contact with the mixture, and then bring the olefin (e.g., propylene) or a mixture of propylene and one or more additional olefins into contact with the mixture.

When producing a propylene block copolymer, two or more polymerization steps are performed. Propylene is normally polymerized in the first step in the presence of the polymerization catalyst, and ethylene and propylene are copolymerized in the second step. It is possible to copolymerize or polymerize an α-olefin other than propylene in the second or subsequent step. Examples of the α-olefin include ethylene, 1-butene, 4-methyl-1-pentene, vinylcyclohexane, 1-hexene, 1-octene, and the like. Specifically, the polymerization temperature and the polymerization time in the first step are adjusted so that the content of polypropylene blocks is 20 to 80 wt %. In the second step, ethylene and propylene or an additional α-olefin are introduced, and polymerized so that the content of rubber blocks (e.g., ethylene-propylene rubber (EPR)) is 20 to 80 wt %. The polymerization temperature in the first step and the second step is preferably 200° C. or less, and preferably 100° C. or less. The polymerization pressure is 10 MPa or less, and preferably 5 MPa or less. The polymerization time in each polymerization step (or the residence time when using continuous polymerization) is normally 1 minute to 5 hours.

Examples of the polymerization method include a slurry polymerization method that utilizes an inert hydrocarbon solvent such as cyclohexane or heptane, a bulk polymerization method that utilizes a solvent such as liquefied propylene, and a vapor-phase polymerization method in which a solvent is not substantially used. The bulk polymerization method and the vapor-phase polymerization method are preferable.

EXAMPLES

The invention is further described below by way of examples. Note that the following examples are for illustration purposes only, and the invention is not limited to the following examples.

Production Example 1

Dimethyl benzylidenemalonate was prepared as described below in accordance with the method described in "Bioorganic & Medical Chemistry, Vol. 4, 7377 (2006)". Synthesis of dimethyl benzylidenemalonate Titanium tetrachloride (43.6 g), benzaldehyde (17.2 g), and pyridine (36.7 g) were sequentially added to an anhydrous THF solution (1.2 l) of dimethyl malonate (15.3 g) at 0° C. The mixture was stirred and reacted at 25° C. for 16 hours. The reaction solution was poured into iced water to quench the reaction, and extracted with ethyl acetate. The extract was washed with salt water, and dehydrated using sodium sulfate. The dehydrated solution was concentrated using a rotary evaporator, and distilled under vacuum to obtain a reaction product (17 g, yield: 68%). The $^1$H-NMR spectrum of the reaction product obtained using a nuclear magnetic resonance spectrometer was analyzed, and it was found that the chemical shift values were 3.77 (s, 6H), 7.46 (m, 5H), and 7.76 (s, 1H). It was thus confirmed that the product was dimethyl benzylidenemalonate. The purity of the resulting dimethyl benzylidenemalonate determined by liquid chromatography was 100%.

Production Example 2

Synthesis of di-n-butyl benzylidenemalonate

The target product was obtained in the same manner as in Production Example 1, except that di-n-butyl malonate was used instead of dimethyl malonate (yield: 88%). The $^1$H-NMR spectrum of the product obtained using a nuclear magnetic resonance spectrometer was analyzed, and it was found that the chemical shift values were 0.89 (t, 3H), 0.95 (t, 3H), 1.28-1.45 (m, 4H), 1.58-1.72 (m, 4H), 4.25 (q, 4H), 7.34-7.39 (m, 3H), 7.43-7.46 (m, 3H), and 7.73 (s, 1H). It was thus confirmed that the product was di-n-butyl benzylidenemalonate. The purity of the resulting di-n-butyl benzylidenemalonate determined by liquid chromatography was 100%.

Production Example 3

Synthesis of diethyl(2-methylphenylmethylene)malonate

The target product was obtained in the same manner as in Production Example 1, except that o-tolualdehyde was used instead of benzaldehyde, and diethyl malonate was used instead of dimethyl malonate (yield: 98%). The $^1$H-NMR spectrum of the product obtained using a nuclear magnetic resonance spectrometer was analyzed, and it was found that the chemical shift values were 1.15 (t, 3H), 1.33 (t, 3H), 2.36 (s, 3H), 4.20 (q, 2H), 4.28 (q, 2H), 7.14-7.34 (m, 4H), 7.96 (s, 1H). It was thus confirmed that the product was diethyl(2-methylphenylmethylene)malonate. The purity of the resulting diethyl(2-methylphenylmethylene)malonate determined by liquid chromatography was 99%.

Production Example 4

Synthesis of dimethyl(4-methylphenylmethylene)malonate

The target product was obtained in the same manner as in Production Example 1, except that p-tolualdehyde was used instead of benzaldehyde (yield: 49%). The $^1$H-NMR spectrum of the product obtained using a nuclear magnetic resonance spectrometer was analyzed, and it was found that the chemical shift values were 2.39 (s, 3H), 3.86 (s, 3H), 3.87 (s, 3H), 7.21 (d, 2H), 7.34 (d, 2H), 7.76 (s, 1H). It was thus confirmed that the product was dimethyl(4-methylphenylmethylene)malonate. The purity of the resulting dimethyl(4-methylphenylmethylene)malonate determined by liquid chromatography was 100%.

Production Example 5

Synthesis of diethyl(1-ethylbenzylidene)malonate

The target product was obtained in the same manner as in Production Example 1, except that propiophenone was used instead of benzaldehyde, and diethyl malonate was used instead of dimethyl malonate (yield: 8%). The $^1$H-NMR spectrum of the product obtained using a nuclear magnetic resonance spectrometer was analyzed, and it was found that the chemical shift values were 0.92 (t, 2H), 1.00 (t, 3H), 1.31 (t, 3H), 2.76 (q, 2H), 3.92 (q, 2H), 4.27 (q, 2H), 7.15-7.23 (m, 2H), 7.30-7.40 (m, 3H). It was thus confirmed that the product was diethyl(1-ethylbenzylidene)malonate. The purity of the resulting diethyl(1-ethylbenzylidene)malonate determined by liquid chromatography was 99%.

Production Example 6

Synthesis of diethyl(1-ethylpropylidene)malonate

The target product was obtained in the same manner as in Production Example 1, except that 3-pentanone was used instead of benzaldehyde, and diethyl malonate was used instead of dimethyl malonate (yield: 29%). The $^1$H-NMR spectrum of the reaction product obtained using a nuclear magnetic resonance spectrometer was analyzed, and it was found that the chemical shift values were 1.09 (t, 6H), 2.27 (t, 6H), 2.36 (q, 4H), 4.20 (q, 4H). It was thus confirmed that the product was diethyl(1-ethylpropylidene)malonate. The purity of the resulting diethyl(1-ethylpropylidene)malonate determined by liquid chromatography was 100%.

Production Example 7

Synthesis of diethyl(2,2-dimethylpropylidene)malonate

The target product was obtained in the same manner as in Production Example 1, except that 2,2-dimethylpropionaldehyde was used instead of benzaldehyde, and diethyl malonate was used instead of dimethyl malonate (yield: 44%). The $^1$H-NMR spectrum of the product obtained using a nuclear magnetic resonance spectrometer was analyzed, and it was found that the chemical shift values were 1.13 (s, 9H), 1.27 (t, 3H), 1.32 (t, 3H), 4.21 (q, 2H), 4.27 (q, 2H), 6.87 (s, 1H). It was thus confirmed that the product was diethyl(2,2-dimethylpropylidene)malonate. The purity of the resulting diethyl(2,2-dimethylpropylidene)malonate determined by liquid chromatography was 99%.

Production Example 8

Synthesis of diethyl(cyclohexylmethylene)malonate

The target product was obtained in the same manner as in Production Example 1, except that cyclohexanecarbaldehyde was used instead of benzaldehyde, and diethyl malonate was used instead of dimethyl malonate (yield: 44%). The $^1$H-NMR spectrum of the product obtained using a nuclear magnetic resonance spectrometer was analyzed, and it was found that the chemical shift values were 1.22-1.35 (m, 10H), 1.70-1.80 (m, 6H), 2.36-2.44 (m, 1H), 4.22 (q, 2H), 4.28 (q, 2H), 6.78 (d, 1H). It was thus confirmed that the product was diethyl(cyclohexylmethylene)malonate. The purity of the resulting diethyl(cyclohexylmethylene)malonate determined by liquid chromatography was 100%.

Example 1

Synthesis of Solid Catalyst Component

A 500 ml flask equipped with a stirrer, of which the internal atmosphere had been sufficiently replaced with nitrogen gas, was charged with 10 g (87.4 mmol) of diethoxymagnesium, 55 ml of toluene, 30 ml of titanium tetrachloride, and 3.8 g (15.3 mmol) of diethyl benzylidenemalonate. The mixture was heated to 100° C. The mixture was then reacted at 100° C. for 90 minutes. After completion of the reaction, the resulting reaction product was washed four times with 75 ml of toluene (100° C.). After the addition of 10 ml of a 10 vol % toluene solution of titanium tetrachloride, the mixture was heated to 100° C., and stirred and reacted for 15 minutes. The mixture was then washed once with toluene (100° C.). After repeating the above operation twice, the mixture was washed six times with 75 ml of n-heptane (40° C.) to obtain a solid catalyst component (A). The solid catalyst component was subjected to solid-liquid separation, and the titanium content in the solid was determined, and found to be 2.9 wt %. The titanium content and the diethyl benzylidenemalonate content in the solid were measured as described below.

Titanium Content in Solid

The titanium content in the solid was measured in accordance with JIS M 8301. Diethyl benzylidenemalonate content in solid The content of the internal electron donor compound such as diethyl benzylidenemalonate included in the solid catalyst component was measured using a gas chromatograph ("GC-14B" manufactured by Shimadzu Corporation) under the following conditions.

Measurement Conditions

Column: packed column (2.6 (diamater)×2.1 m, Silicone SE-30 10%, Chromosorb WAW DMCS 80/100, manufactured by GL Sciences Inc.)

Detector: flame ionization detector (FID)

Carrier gas: helium, flow rate: 40 ml/min

Measurement temperature: vaporization chamber: 280° C., column: 225° C., detector: 280° C.

Preparation of Polymerization Catalyst and Polymerization

A 2.0 l autoclave equipped with a stirrer, of which the internal atmosphere had been completely replaced with nitrogen gas, was charged with 1.32 mmol of triethylaluminum, 0.13 mmol of cyclohexylmethyldimethoxysilane (CMDMS), and the solid component in an amount equivalent to 0.0026 mmol of titanium atoms to obtain a polymerization catalyst. After the addition of 1.5 l of hydrogen gas and 1.4 l of liquified propylene, preliminary polymerization was effected at 20° C. for 5 minutes. The mixture was heated to 70° C., and polymerized for 1 hour. The polymerization activity per gram of the solid catalyst component, the p-xylene-soluble content (XS) in the resulting polymer, and the melt flow rate (MFR) of the resulting polymer are shown in Table 1.

Polymerization Activity Per Gram of Solid Catalyst Component

The polymerization activity per gram of the solid catalyst component was calculated by the following expression.

Polymerization activity($g$-$pp$/$g$-catalyst)=mass (g) of polymer/mass (g) of solid catalyst component Measurement of Xylene-Soluble Content (XS) in Polymer A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) lower than the boiling point. The solution was then cooled to 23° C. over 1 hour, and an insoluble component and a soluble component were separated by filtration. A solution of the soluble component was collected, and p-xylene was evaporated by heating and drying under reduced pressure. The weight of the residue (xylene-soluble component) was calculated as a value (wt %) relative to the weight of the polymer (polypropylene), and taken as the xylene-soluble content (XS).

Melt Flow Rate (MFR) of Polymer

The melt flow rate (MFR) (melt flow index) of the polymer was measured in accordance with ASTM D 1238 (JIS K 7210).

Molecular Weight Distribution of Polymer

The molecular weight distribution of the polymer was evaluated by the ratio "Mw/Mn" of the weight average molecular weight (Mw) to the number average molecular weight (Mn) measured by gel permeation chromatography (GPC) ("GPCV2000" manufactured by Waters) under the following conditions.

Solvent: o-dichlorobenzene (ODCB)
Temperature: 140° C. (SEC)
Column: Shodex GPC UT-806M
Sample concentration: 1 g/1-ODCB (50 mg/50 ml-ODCB)
Injection amount: 0.5 ml
Flow rate: 1.0 ml/min Example 2

Polymerization was effected in the same manner as in Example 1, except that 0.13 mmol of dicyclopentyldimethoxysilane (DCPDMS) was used instead of 0.13 mmol of cyclohexylmethyldimethoxysilane (CMDMS). The polymerization results are shown in Table 1.

Example 3

Polymerization was effected in the same manner as in Example 1, except that 0.13 mmol of diisopropyldimethoxysilane (DIPDMS) was used instead of 0.13 mmol of cyclohexylmethyldimethoxysilane (CMDMS). The polymerization results are shown in Table 1.

Example 4

Polymerization was effected in the same manner as in Example 1, except that 0.13 mmol of diethylaminotriethoxysilane (DEATES) was used instead of 0.13 mmol of cyclohexylmethyldimethoxysilane (CMDMS). The polymerization results are shown in Table 1.

Example 5

Polymerization was effected in the same manner as in Example 1, except that 0.13 mmol of 9,9-bis(methoxymethyl)fluorene (BMMF) was used instead of 0.13 mmol of cyclohexylmethyldimethoxysilane (CMDMS). The polymerization results are shown in Table 1.

Comparative Example 1

A solid catalyst component was produced, a polymerization catalyst was prepared, and polymerization was effected in the same manner as in Example 1, except that 15.3 mmol of diethyl diisobutylmalonate was used instead of 15.3 mmol of diethyl benzylidenemalonate. The titanium content in the resulting solid catalyst component was 3.9 wt %. The polymerization results are shown in Table 1.

Comparative Example 2

A solid catalyst component was produced, a polymerization catalyst was prepared, and polymerization was effected in the same manner as in Example 1, except that 15.3 mmol of diethyl diisopropylsuccinate was used instead of 15.3 mmol of diethyl benzylidenemalonate. The titanium content in the resulting solid catalyst component was 2.1 wt %. The polymerization results are shown in Table 1.

Comparative Example 3

Polymerization was effected in the same manner as in Comparative Example 2, except that 0.13 mmol of dicyclopentyldimethoxysilane (DCPDMS) was used instead of 0.13 mmol of cyclohexylmethyldimethoxysilane (CMDMS). The polymerization results are shown in Table 1.

Comparative Example 4

A solid catalyst component was produced, a polymerization catalyst was prepared, and polymerization was effected in the same manner as in Example 1, except that 15.3 mmol of di-n-butyl phthalate was used instead of 15.3 mmol of diethyl benzylidenemalonate. The titanium content in the resulting solid catalyst component was 2.7 wt %. The polymerization results are shown in Table 1.

Comparative Example 5

Polymerization was effected in the same manner as in Comparative Example 4, except that 0.13 mmol of dicyclopentyldimethoxysilane (DCPDMS) was used instead of 0.13 mmol of cyclohexylmethyldimethoxysilane (CMDMS). The polymerization results are shown in Table 1.

Comparative Example 6

Polymerization was effected in the same manner as in Comparative Example 4, except that 0.13 mmol of diethylaminotriethoxysilane (DEATES) was used instead of 0.13 mmol of cyclohexylmethyldimethoxysilane (CMDMS). The polymerization results are shown in Table 1.

Comparative Example 7

Polymerization was effected in the same manner as in Comparative Example 4, except that 0.13 mmol of 9,9-bis (methoxymethyl)fluorene (BMMF) was used instead of 0.13 mmol of cyclohexylmethyldimethoxysilane (CMDMS). The polymerization results are shown in Table 1.

Example 6

Synthesis of Solid Catalyst Component (B)

A solid catalyst component (B) was produced in the same manner as in Example 1, except that 15.3 mmol of dimethyl benzylidenemalonate obtained in Production Example 1 was used instead of 15.3 mmol of diethyl benzylidenemalonate. The titanium content in the resulting solid catalyst component was 2.7 wt %, and the dimethyl benzylidenemalonate content in the solid catalyst component was 8.3 wt %.

Preparation of Polymerization Catalyst and Polymerization

A polymerization catalyst was prepared, and polymerization was effected in the same manner as in Example 1, except that the solid catalyst component (B) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 7

Synthesis of Solid Catalyst Component (C)

A solid catalyst component (C) was produced in the same manner as in Example 1, except that 15.3 mmol of di-n-butyl benzylidenemalonate obtained in Production Example 2 was used instead of 15.3 mmol of diethyl benzylidenemalonate. The titanium content in the resulting solid catalyst component was 3.1 wt %, and the di-n-butyl benzylidenemalonate content in the solid catalyst component was 11.9 wt %.

Preparation of Polymerization Catalyst and Polymerization

A polymerization catalyst was prepared, and polymerization was effected in the same manner as in Example 1, except that the solid catalyst component (C) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 8

Synthesis of Solid Catalyst Component (D)

A solid catalyst component (D) was produced in the same manner as in Example 1, except that 15.3 mmol of diethyl(2-methylphenylmethylene)malonate obtained in Production Example 3 was used instead of 15.3 mmol of diethyl benzylidenemalonate. The titanium content in the resulting solid catalyst component was 3.0 wt %, and the diethyl(2-methylphenylmethylene)malonate content in the solid catalyst component was 13.7 wt %.

Preparation of Polymerization Catalyst and Polymerization

A polymerization catalyst was prepared, and polymerization was effected in the same manner as in Example 1, except that the solid catalyst component (D) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 9

Synthesis of Solid Catalyst Component (E)

A solid catalyst component (E) was produced in the same manner as in Example 1, except that 15.3 mmol of dimethyl (4-methylphenylmethylene)malonate obtained in Production Example 4 was used instead of 15.3 mmol of diethyl benzylidenemalonate. The titanium content in the resulting solid catalyst component was 1.6 wt %, and the dimethyl(4-methylphenylmethylene)malonate content in the solid catalyst component was 16.5 wt %.

Preparation of Polymerization Catalyst and Polymerization

A polymerization catalyst was prepared, and polymerization was effected in the same manner as in Example 1, except that the solid catalyst component (E) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 10

Synthesis of Solid Catalyst Component (F)

A solid catalyst component (F) was produced in the same manner as in Example 1, except that 15.3 mmol of diethyl(1-ethylbenzylidene)malonate obtained in Production Example 5 was used instead of 15.3 mmol of diethyl benzylidenemalonate. The titanium content in the resulting solid catalyst component was 2.6 wt %, and the diethyl(1-ethylbenzylidene)malonate content in the solid catalyst component was 9.3 wt %.

Preparation of Polymerization Catalyst and Polymerization

A polymerization catalyst was prepared, and polymerization was effected in the same manner as in Example 1, except that the solid catalyst component (F) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 11

Synthesis of Solid Catalyst Component (G)

A solid catalyst component (G) was produced in the same manner as in Example 1, except that 15.3 mmol of diethyl(1-ethylpropylidene)malonate obtained in Production Example 6 was used instead of 15.3 mmol of diethyl benzylidenemalonate. The titanium content in the resulting solid catalyst component was 2.9 wt %, and the diethyl(1-ethylpropylidene)malonate content in the solid catalyst component was 8.8 wt %.

Preparation of Polymerization Catalyst and Polymerization

A polymerization catalyst was prepared, and polymerization was effected in the same manner as in Example 1, except that the solid catalyst component (G) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 12

Synthesis of Solid Catalyst Component (H)

A solid catalyst component (H) was produced in the same manner as in Example 1, except that 15.3 mmol of diethyl(2,2-dimethylpropylidene)malonate obtained in Production Example 7 was used instead of 15.3 mmol of diethyl benzylidenemalonate. The titanium content in the resulting solid catalyst component was 2.6 wt %, and the diethyl(2,2-dimethylpropylidene)malonate content in the solid catalyst component was 10.8 wt %.

Preparation of Polymerization Catalyst and Polymerization

A polymerization catalyst was prepared, and polymerization was effected in the same manner as in Example 1, except that the solid catalyst component (H) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 13

Synthesis of Solid Catalyst Component (I)

A solid catalyst component (I) was produced in the same manner as in Example 1, except that 15.3 mmol of diethyl (cyclohexylmethylene)malonate obtained in Production Example 14 was used instead of 15.3 mmol of diethyl benzylidenemalonate. The titanium content in the resulting solid catalyst component was 2.8 wt %, and the diethyl(cyclohexylmethylene)malonate content in the solid catalyst component was 13.3 wt %.

Preparation of Polymerization Catalyst and Polymerization

A polymerization catalyst was prepared, and polymerization was effected in the same manner as in Example 1, except that the solid catalyst component (I) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 14

Synthesis of Solid Catalyst Component (J)

A solid catalyst component (J) was produced in the same manner as in Example 1, except that 15.3 mmol of diethyl benzylidenemalonate and 1.5 mmol of dimethyl diisobutylmalonate were used instead of 15.3 mmol of diethyl benzylidenemalonate. The titanium content in the resulting solid catalyst component was 2.5 wt %, the diethyl benzylidenemalonate content in the solid catalyst component was 9.8 wt % (0.40 mmol), and the dimethyl diisobutylmalonate content in the solid catalyst component was 2.1 wt % (0.09 mmol).

Preparation of Polymerization Catalyst and Polymerization

A polymerization catalyst was prepared, and polymerization was effected in the same manner as in Example 1, except that the solid catalyst component (J) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 15

Synthesis of Solid Catalyst Component (K)

A solid catalyst component (K) was produced in the same manner as in Example 1, except that 15.3 mmol of diethyl benzylidenemalonate and 1.5 mmol of diethyl diisobutylmalonate were used instead of 15.3 mmol of diethyl benzylidenemalonate. The titanium content in the resulting solid catalyst component was 2.5 wt %, the diethyl benzylidenemalonate content in the solid catalyst component was 11.1 wt % (0.45 mmol), and the diethyl diisobutylmalonate content in the solid catalyst component was 2.4 wt % (0.09 mmol).

Preparation of Polymerization Catalyst and Polymerization

A polymerization catalyst was prepared, and polymerization was effected in the same manner as in Example 1, except that the solid catalyst component (K) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 16

Synthesis of Solid Catalyst Component (M)

A solid catalyst component (M) was produced in the same manner as in Example 1, except that 15.3 mmol of diethyl benzylidenemalonate and 1.5 mmol of 9,9-bis(methoxymethyl)fluorene were used instead of 15.3 mmol of diethyl benzylidenemalonate. The titanium content in the resulting solid catalyst component was 2.5 wt %, the diethyl benzylidenemalonate content in the solid catalyst component was 11.1 wt % (0.45 mmol), and the 9,9-bis(methoxymethyl) fluorene content in the solid catalyst component was 4.6 wt % (0.18 mmol).

Preparation of Polymerization Catalyst and Polymerization

A polymerization catalyst was prepared, and polymerization was effected in the same manner as in Example 1, except that the solid catalyst component (M) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 17

Synthesis of Solid Catalyst Component (N)

A solid catalyst component (N) was produced in the same manner as in Example 1, except that 15.3 mmol of diethyl(1-ethylpropylidene)malonate and 1.5 mmol of dimethyl diisobutylmalonate were used instead of 15.3 mmol of diethyl benzylidenemalonate. The titanium content in the resulting solid catalyst component was 2.5 wt %, the diethyl(1-ethylpropylidene)malonate content in the solid catalyst component was 9.6 wt % (0.42 mmol), and the dimethyl diisobutylmalonate content in the solid catalyst component was 3.3 wt % (0.14 mmol).

Preparation of Polymerization Catalyst and Polymerization

A polymerization catalyst was prepared, and polymerization was effected in the same manner as in Example 1, except that the solid catalyst component (N) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 18

Synthesis of Solid Catalyst Component (O)

A solid catalyst component (O) was produced in the same manner as in Example 1, except that 15.3 mmol of diethyl(2- methylphenylmethylene)malonate and 1.5 mmol of dimethyl diisobutylmalonate were used instead of 15.3 mmol of diethyl benzylidenemalonate. The titanium content in the resulting solid catalyst component was 2.4 wt %, the diethyl(2-methylphenylmethylene)malonate content in the solid catalyst component was 9.3 wt % (0.35 mmol), and the dimethyl diisobutylmalonate content in the solid catalyst component was 3.1 wt % (0.13 mmol).

Preparation of Polymerization Catalyst and Polymerization

A polymerization catalyst was prepared, and polymerization was effected in the same manner as in Example 1, except that the solid catalyst component (O) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

Example 19

Synthesis of Solid Catalyst Component (P)

A 200 ml flask equipped with a stirrer, of which the internal atmosphere had been sufficiently replaced with nitrogen gas, was charged with 5.7 g of the solid catalyst component obtained in Example 1 and 70 ml of heptane to prepare a suspension. The suspension was heated to 30° C. 6 mmol of divinyldimethylsilane, 18 mmol of triethylaluminum, and 6 mmol of dicyclopentyldimethoxysilane were sequentially added to the suspension with stirring. After the addition of 15 ml of heptane, the mixture was reacted at 30° C. for 2 hours. After completion of the reaction, the supernatant liquid was removed by decantation. The solid component in the flask was washed three times with 150 ml of heptane (30° C.) to obtain a solid catalyst component (P). The titanium content in the solid catalyst component was 1.7 wt %.

Preparation of Polymerization Catalyst and Polymerization

A polymerization catalyst was prepared, and polymerization was effected in the same manner as in Example 1, except that the solid catalyst component (P) was used instead of the solid catalyst component (A), and 0.13 mmol of cyclohexylmethyldimethoxysilane (CMDMS) was not added. Specifically, the polymerization catalyst was formed by the solid catalyst component (P) and triethylaluminum. The polymerization results are shown in Table 1.

Example 20

Preparation of Solid Catalyst Component (Q)

A 500 ml round-bottom flask, of which the internal atmosphere had been sufficiently replaced with nitrogen, was charged with 120 ml of purified n-heptane. After the addition of 15 g of anhydrous magnesium chloride and 106 ml of $Ti(O-n-Bu)_4$, the mixture was reacted at 90° C. for 1.5 hours to obtain a homogenous solution. The solution was cooled to 40° C. After the addition of 24 ml of methyl hydrogen polysiloxane (viscosity: 20 cSt) while maintaining the solution at 40° C., the mixture was subjected to a precipitation reaction for 5 hours. A precipitated solid product was sufficiently washed with purified n-heptane. A 500 ml round-bottom flask equipped with a stirrer, of which the internal atmosphere had been sufficiently replaced with nitrogen, was charged with 40 g of the solid product, and purified n-heptane was added to the flask so that the concentration of the solid product was 200 mg/ml. After the addition of 12 ml of $SiCl_4$, the mixture was reacted at 90° C. for 3 hours. The reaction product was sufficiently washed with purified n-heptane, and purified n-heptane was added to the flask so that the concentration of the reaction product was 100 mg/ml.

After the addition of 10 mmol of diethyl benzylidenemalonate, the mixture was reacted at 70° C. for 1 hour. The reaction product was sufficiently washed with purified n-heptane, followed by the addition of 100 ml of purified n-heptane. After the addition of 20 ml of $TiCl_4$, the mixture was reacted at 95° C. for 3 hours. After completion of the reaction, the supernatant liquid was removed. After the addition of 20 ml of $TiCl_4$, the mixture was reacted at 100° C. for 2 hours. The reaction product was sufficiently washed with purified n-heptane. The resulting solid product was dried under reduced pressure to obtain a powdery solid catalyst component (Q). The titanium content in the resulting solid catalyst component was 2.1 wt %, and the diethyl benzylidenemalonate content in the solid catalyst component was 15.6 wt %.

Preparation of Polymerization Catalyst and Polymerization

A polymerization catalyst was prepared, and polymerization was effected in the same manner as in Example 1, except that the solid catalyst component (Q) was used instead of the solid catalyst component (A), and 0.13 mmol of dicyclopentyldimethoxysilane (DCPDMS) was used instead of 0.13 mmol of cyclohexylmethyldimethoxysilane (CMDMS). The polymerization results are shown in Table 1.

TABLE 1

| Test Example | Internal donor | External donor | Polymerization activity (g-pp/g-catalyst) | XS (wt %) | MFR (g/10 min) | Mw/Mn |
|---|---|---|---|---|---|---|
| Example 1 | Diethyl benzylidenemalonate | CMDMS | 61,700 | 3.1 | 7.7 | 4.9 |
| Example 2 | Diethyl benzylidenemalonate | DCPDMS | 58,800 | 1.5 | 2.0 | 5.3 |
| Example 3 | Diethyl benzylidenemalonate | DIPDMS | 54,800 | 2.2 | 4.6 | 5.3 |
| Example 4 | Diethyl benzylidenemalonate | DEATES | 41,900 | 2.9 | 29 | 4.5 |
| Example 5 | Diethyl benzylidenemalonate | BMMF | 55,600 | 2.2 | 9.5 | 5.0 |
| Comparative Example 1 | Diethyl diisobutylmalonate | CMDMS | 47,700 | 3.1 | 25 | 4.8 |
| Comparative Example 2 | Diethyl diisopropylsuccinate | CMDMS | 27,100 | 1.7 | 6.2 | 7.1 |
| Comparative Example 3 | Diethyl diisopropylsuccinate | DCPDMS | 24,100 | 1.5 | 4.5 | 6.5 |
| Comparative Example 4 | Di-n-butyl phthalate | CMDMS | 58,900 | 1.8 | 4.5 | 5.1 |
| Comparative Example 5 | Di-n-butyl phthalate | DCPDMS | 56,800 | 1.4 | 1.6 | 4.8 |
| Comparative Example 6 | Di-n-butyl phthalate | DEATES | 52,000 | 2.5 | 27 | 4.3 |
| Comparative Example 7 | Di-n-butyl phthalate | BMMF | 45,000 | 1.5 | 7.2 | 4.6 |
| Example 6 | Dimethyl benzylidenemalonate | DCPDMS | 45,900 | 1.3 | 2.0 | 4.8 |
| Example 7 | Di-n-butyl benzylidenemalonate | DCPDMS | 53,500 | 2.7 | 2.6 | 5.4 |
| Example 8 | Diethyl (2-methylphenylmethylene)malonate | DCPDMS | 60,500 | 1.9 | 1.7 | 5.0 |
| Example 9 | Dimethyl (4-methylphenylmethylene)malonate | DCPDMS | 45,000 | 1.4 | 3.7 | 5.5 |
| Example 10 | Diethyl (1-ethylbenzylidene)malonate | DCPDMS | 49,000 | 2.6 | 5.9 | 5.5 |
| Example 11 | Diethyl (1-ethylpropylidene)malonate | DCPDMS | 52,200 | 2.0 | 2.8 | 6.0 |

TABLE 1-continued

| Test Example | Internal donor | External donor | Polymerization activity (g-pp/g-catalyst) | XS (wt %) | MFR (g/10 min) | Mw/Mn |
|---|---|---|---|---|---|---|
| Example 12 | Diethyl (2,2-dimethylpropylidene)malonate | DCPDMS | 46,000 | 1.9 | 3.5 | 6.3 |
| Example 13 | Diethyl (cyclohexylmethylene)malonate | DCPDMS | 47,100 | 2.3 | 2.7 | 5.6 |
| Example 14 | BDMDE + dimethyl diisobutylmalonate | DCPDMS | 54,100 | 1.4 | 4.4 | 5.7 |
| Example 15 | BDMDE + diethyl diisobutylmalonate | DCPDMS | 54,700 | 1.3 | 2.7 | 6.0 |
| Example 16 | BDMDE + 9,9-bis(methoxymethyl)fluorene | DCPDMS | 54,500 | 1.0 | 3.2 | 5.0 |
| Example 17 | EPDMDE + dimethyl diisobutylmalonate | DCPDMS | 56,600 | 2.0 | 7.6 | 5.6 |
| Example 18 | MPhMMDE + dimethyl diisobutylmalonate | DCPDMS | 58,000 | 1.4 | 3.6 | 6.2 |
| Example 19 | Diethyl benzylidenemalonate + DBDMS + TEA + DCPDMS | — | 48,100 | 2.6 | 5.3 | 6.1 |
| Example 20 | Diethyl benzylidenemalonate | DCPDMS | 58,900 | 2.4 | 4.9 | 5.8 |

Note:
BDMDE: diethyl benzylidenemalonate,
EPDMDE: diethyl (1-ethylpropylidene)malonate,
MPhMMDE: diethyl (2-methylphenylmethylene)malonate
DBDMS: divinyldimethylsilane,
TEA: triethylaluminum

INDUSTRIAL APPLICABILITY

The olefin polymerization catalyst according to the embodiments of the invention ensures that an olefin polymer having primary properties (e.g., molecular weight distribution and stereoregularity) similar to those of an olefin based polymer obtained using a solid catalyst component that includes a phthalic ester, can be obtained in high yield without using a phthalic ester.

The invention claimed is:

1. A solid catalyst component, comprising titanium, magnesium, a halogen, and an ester compound of formula (1);

$$R^1R^2C=C(COOR^3)(COOR^4) \quad (1),$$

wherein:
$R^1$ and $R^2$ are independently an atom or a group selected from a hydrogen atom, a halogen, a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 20 carbon atoms, a nitrogen-containing group, an oxygen-containing group, a phosphorus-containing group, and a silicon-containing group, provided that $R^1$ and $R^2$ optionally bond to each other to form a ring, and the number of carbon atoms of $R^2$ is 2 or more when $R^1$ is a hydrogen atom or a methyl group; and
$R^3$ and $R^4$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 carbon atoms.

2. The solid catalyst component of claim 1, wherein $R^1$ or $R^2$ in the formula (1) is a hydrogen atom, a linear alkyl group having 1 to 6 carbon atoms, a branched alkyl group having 3 to 6 carbon atoms, a vinyl group, a linear or branched alkenyl group having 3 to 6 carbon atoms, a cycloalkyl group having 5 or 6 carbon atoms, a cycloalkenyl group having 5 or 6 carbon atoms, or an aromatic hydrocarbon group having 6 to 10 carbon atoms.

3. The solid catalyst component of claim 1, wherein:
$R^1$ in the formula (1) is a hydrogen atom or a linear alkyl group having 1 to 6 carbon atoms; and
$R^2$ in the formula (1) is a linear alkyl group having 1 to 6 carbon atoms, a branched alkyl group having 3 to 6 carbon atoms, a cycloalkyl group having 5 or 6 carbon atoms, or an aromatic hydrocarbon group having 6 to 10 carbon atoms.

4. The solid catalyst component of claim 1, wherein $R^3$ or $R^4$ in the formula (1) is a linear alkyl group having 1 to 10 carbon atoms or a branched alkyl group having 3 to 8 carbon atoms.

5. An olefin polymerization catalyst, comprising:
(I) the solid catalyst component of claim 1; and
(II) an organoaluminum compound represented by formula (2);

$$R^5_pAlQ_{3-p} \quad (2),$$

wherein:
$R^5$ is an alkyl group having 1 to 6 carbon atoms;
Q is a hydrogen atom or a halogen; and
p is a real number that satisfies $0 < p \leq 3$,
provided that a plurality of $R^5$ are either identical or different when a plurality of $R^5$ are present.

6. The olefin polymerization catalyst of claim 5, further comprising:
(III) an external electron donor compound.

7. The olefin polymerization catalyst of claim 6, wherein the external electron donor compound (III) is at least one organosilicon compound selected from the group consisting of an organosilicon compound of formula (3) and an organosilicon compound of formula (4):

$$R^6_qSi(OR^7)_{4-q} \quad (3),$$

$$(R^8R^9N)_sSiR^{10}_{4-s} \quad (4),$$

wherein:
$R^6$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms;
q is an integer that satisfies $0 < q \leq 3$, wherein a plurality of $R^6$ are either identical or different when q is equal to or larger than 2;
$R^7$ is an alkyl group having 1 to 4 carbon atoms, a cycloalkyl group having 3 to 6 carbon atoms, a phenyl group, a vinyl group, an allyl group, or an aralkyl group, wherein a plurality of $R^7$ are either identical or different when a plurality of $R^7$ are present;

$R^8$ and $R^9$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, wherein $R^8$ and $R^9$ are either identical or different, and optionally bond to each other to form a ring; and $R^{19}$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, wherein a plurality of $R^{19}$ are either identical or different when a plurality of $R^{10}$ are present, and s is an integer from 1 to 3.

8. The olefin polymerization catalyst of claim 6, wherein the external electron donor compound (III) is a diether of formula (5):

$$R^{11}R^{12}R^{13}COCH_2(R^{17}R^{18}C)CH_2OCR^{14}R^{15}R^{16} \quad (5),$$

wherein:

$R^{11}$ to $R^{16}$ are a hydrogen atom, a linear alkyl group having 1 to 6 carbon atoms, a branched alkyl group having 3 to 6 carbon atoms, a cycloalkyl group having 3 to 6 carbon atoms, or a phenyl group, wherein $R^{11}$ to $R^{16}$ are either identical or different; and $R^{17}$ and $R^{18}$ are a hydrogen atom, a linear alkyl group having 1 to 6 carbon atoms, a branched alkyl group having 3 to 6 carbon atoms, a cycloalkyl group having 3 to 6 carbon atoms, or a phenyl group, wherein $R^{17}$ and $R^{18}$ are either identical or different group, and optionally bond to each other to form a ring.

9. The olefin polymerization catalyst of claim 7, wherein the organosilicon compound is at least one one selected from the group consisting of phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, and diethylaminotriethoxysilane.

10. The olefin polymerization catalyst of claim 8, wherein the diether is 2-isopropyl-2-isobutyl-1,3-dimethoxypropane or 9,9-bis(methoxymethyl)fluorene.

11. A method for producing an olefin polymer, the method comprising polymerizing an olefin in the presence of the olefin polymerization catalyst of claim 5.

12. The solid catalyst component of claim 2, wherein:

$R^1$ in the formula (1) is a hydrogen atom or a linear alkyl group having 1 to 6 carbon atoms; and $R^2$ in the formula (1) is a linear alkyl group having 1 to 6 carbon atoms, a branched alkyl group having 3 to 6 carbon atoms, a cycloalkyl group having 5 or 6 carbon atoms, or an aromatic hydrocarbon group having 6 to 10 carbon atoms.

13. The solid catalyst component of claim 2, wherein $R^3$ or $R^4$ in the formula (1) is a linear alkyl group having 1 to 10 carbon atoms or a branched alkyl group having 3 to 8 carbon atoms.

14. An olefin polymerization catalyst, comprising:

(I) the solid catalyst component of claim 2; and (II) an organoaluminum compound of formula (2);

$$R^5_p AlQ_{3-p} \quad (2),$$

wherein:

$R^5$ is an alkyl group having 1 to 6 carbon atoms;

Q is a hydrogen atom or a halogen; and p is a real number that satisfies $0 < p \leq 3$, wherein a plurality of $R^5$ are either identical or different when a plurality of $R^5$ are present.

15. The olefin polymerization catalyst of claim 14, further comprising:

(III) an external electron donor compound.

16. The solid catalyst component of claim 1, wherein:

$R^1$ is an atom or a group selected from a hydrogen atom, a linear alkyl group having 1 to 6 carbon atoms, a branched alkyl group having 3 to 6 carbon atoms, a cycloalkyl group having 5 or 6 carbon atoms, a cycloalkenyl group having 5 or 6 carbon atoms, and an aromatic hydrocarbon group having 6 to 10 carbon atoms, and $R^2$ is an atom or a group selected from a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, and an aromatic hydrocarbon group having 6 to 20 carbon atoms.

17. An olefin polymerization catalyst, comprising:

(I) the solid catalyst component of claim 16; and (II) an organoaluminum compound of formula (2);

$$R^5_p AlQ_{3-p} \quad (2),$$

wherein:

$R^5$ is an alkyl group having 1 to 6 carbon atoms;

Q is a hydrogen atom or a halogen; and p is a real number that satisfies $0 < p \leq 3$, wherein a plurality of $R^5$ are either identical or different when a plurality of $R^5$ are present.

18. The olefin polymerization catalyst of claim 17, further comprising:

(III) an external electron donor compound.

* * * * *